United States Patent
Boldyrev et al.

(10) Patent No.: US 9,552,234 B2
(45) Date of Patent: Jan. 24, 2017

(54) METHOD AND APPARATUS FOR ENERGY OPTIMIZATION IN MULTI-LEVEL DISTRIBUTED COMPUTATIONS

(75) Inventors: Sergey Boldyrev, Söderkulla (FI); Jari-Jukka Harald Kaaja, Järvenpää (FI); Hannu Ensio Laine, Espoo (FI); Jukka Honkola, Espoo (FI); Vesa-Veikko Luukkala, Espoo (FI); Ian Justin Oliver, Söderkulla (FI)

(73) Assignee: Nokia Technologies Oy, Espoo (FI)

( * ) Notice: Subject to any disclaimer, the term of this patent is extended or adjusted under 35 U.S.C. 154(b) by 1420 days.

(21) Appl. No.: 13/018,022

(22) Filed: Jan. 31, 2011

(65) Prior Publication Data

US 2012/0198251 A1    Aug. 2, 2012

(51) Int. Cl.
*G06F 1/00* (2006.01)
*G06F 9/50* (2006.01)
*G06F 1/32* (2006.01)

(52) U.S. Cl.
CPC ............ *G06F 9/5094* (2013.01); *G06F 1/329* (2013.01); *G06F 9/5088* (2013.01); *Y02B 60/142* (2013.01); *Y02B 60/144* (2013.01); *Y02B 60/162* (2013.01)

(58) Field of Classification Search
CPC ....... G06F 9/5094; G06F 9/5088; G06F 1/329
USPC .................. 713/300–340; 345/506
See application file for complete search history.

(56) References Cited

U.S. PATENT DOCUMENTS

| | | | |
|---|---|---|---|
| 7,127,625 B2 | 10/2006 | Farkas et al. | |
| 8,266,192 B2 * | 9/2012 | Nemoto et al. | 707/821 |
| 2009/0109230 A1 * | 4/2009 | Miller et al. | 345/506 |
| 2010/0284287 A1 | 11/2010 | Venuto | |
| 2011/0055588 A1 * | 3/2011 | DeHaan | 713/189 |
| 2011/0145621 A1 | 6/2011 | Albano et al. | |

FOREIGN PATENT DOCUMENTS

| | | |
|---|---|---|
| EP | 2 287 991 A1 | 2/2011 |
| WO | WO 2011/022098 A1 | 2/2011 |

OTHER PUBLICATIONS

Huang et al., "An Energy-Efficient Middleware for Supporting Multimedia Services in Mobile Grid Environments", 2006, pp. 220-225, International Conference on Information Technology: Coding and Computing, 2005, vol. 2, IEEE.

(Continued)

*Primary Examiner* — Tim T Vo
*Assistant Examiner* — Kim T. Huynh
(74) *Attorney, Agent, or Firm* — Ditthavong & Steiner, P.C.

(57) ABSTRACT

An approach is provided for providing energy optimization in multi-level distributed computations. A distributed computation energy optimization platform determines energy availability information associated with at least one level of a computational architecture executing at least portion of one computation closure. The distributed computation energy optimization platform also determines energy consumption information associated with the at least portion of one computation closure. The distributed computation energy optimization platform further processes and/or facilitates a processing of the energy availability information, the energy consumption information, or a combination thereof to determine whether to migrate the at least portion of one computation closure to at least one other level of the computational architecture.

20 Claims, 16 Drawing Sheets

(56) References Cited

OTHER PUBLICATIONS

International Written Opinion for PCT/FI2011/051140 dated Jun. 1, 2012, pp. 1-5.
International Written Opinion for PCT/FI2011/051140 dated Jun. 1, 2012, pp. 1-10.
Kaefer et al., "Adaptive Power Aware Remote Processing—A Step Towards Power Aware Middleware", 2004, pp. 851-856, IEEE International Conferences on Performance, Computing, and Communications, 2004, IEEE.
Kaefer et al., "Framework for Power Aware Remote Processing: Design and Implementation of a Dynamic Power Estimation Unit", 2001, pp. 159-160, Proceedings of the 5th IEEE International Symposium on Wearable Computers, IEEE.
Kunz et al., "An Adaptive MP3 Player: Reducing Power Consumption and Increasing Application Performance", 2002, pp. 3811-3820, Proceedins of the 35th Annual Hawaii International Conference on System Sciences, IEEE.
Othman et al., "Power Conservation Strategy for Mobile Computers Using Load Sharing", 1998, pp. 44-51, SIGMOBILE Mobile Computing and Communications Review, vol. 2, Issue 1, ACM, Chapter 1, Introduction, Chapter 3.1 The Algorithms.
Rudendo et al., "Saving Portable Computer Battery Power through Remote Process Execution", 1998, pp. 19-26, Mobile Computing and Communications Review, SIGMOBILE, vol. 2, Issue 1, ACM.
Vahdat et al., "Every Joule Is Precious: The Case for Revisiting Operating System Design for Energy Efficiency", 2000, pp. 31-36, Proceedings of the 9th Workshop on ACM SIGOPS European Workshop: Beyond the PC: New Challenges for the Operating System, ACM, Chapter 1.
U.S. Appl. No. 12/825,043, Jun. 28, 2010, Sergey Boldyrev et al.
U.S. Appl. No. 12/829,923, Jul. 2, 2010, Sergey Boldyrev et al.
U.S. Appl. No. 12/916,009, Oct. 29, 2010, Ian Justin Oliver et al.
U.S. Appl. No. 12/979,112, Dec. 27, 2010, Sergey Boldyrev et al.
U.S. Appl. No. 61/387,252, Sep. 28, 2010, Ian Justin Oliver et al.
User Modeling Servers Requirements, Design, and Evaluation, von Josef Fink, Jul. 15, 2003, http://duepublico.uni-duisburg-essen.de/servlets/DerivateServlet/Derivate-11829, pp. 1-205.
Berl, A. et al., "Energy-Efficient Cloud Computing," The Computer Journal, pp. 1-7, 2009.

\* cited by examiner

METHOD AND APPARATUS FOR ENERGY OPTIMIZATION IN MULTI-LEVEL DISTRIBUTED COMPUTATIONS

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications and the information stored by those applications is a major challenge of interoperability. This can be achieved through numerous, individual and personal information spaces in which persons, groups of persons, etc. can place, share, interact and manipulate (or program devices to automatically perform the planning, interaction and manipulation of) webs of information with their own locally agreed semantics without necessarily conforming to an unobtainable, global whole.

Furthermore, in addition to information, the information spaces may be combined with webs of shared and interactive computations or computation spaces so that the devices having connectivity to the computation spaces can have the information in the information space manipulated within the computation space environment and the results delivered to the device, rather than the whole process being performed locally in the device. It is noted that such computation spaces may consist of connectivity between devices, from devices to network infrastructure, to distributed information spaces so that computations can be executed where enough computational elements are available. These combined information spaces and computation spaces often referred to as computation clouds, are extensions of the 'Giant Global Graph' in which one can apply semantics and reasoning at a local level.

In one example, clouds are working spaces respectively embedded with distributed information and computation infrastructures spanned around computers, information appliances, processing devices and sensors that allow people to work efficiently through access to information and computations from computers or other devices. An information space or a computation space can be rendered by the computation devices physically presented as heterogeneous networks (wired and wireless). However, despite the fact that information and computation presented by the respective spaces can be distributed with different granularity, still there are challenges in certain example implementations to achieve scalable high context information processing within such heterogeneous environments. For example, in various implementations, due to distributed nature of the cloud, exchange of data, information, and computation elements (e.g., computation closures) among distributed devices involved in a cloud infrastructure may require excessive amount of resources (e.g. process time, process power, storage space, etc.). In various example circumstances, to enhance the information processing power of a device and reduce the processing cost, one might consider minimizing or at least significantly improving exchange of data, information and computations among the distributed devices. In various example embodiments we can minimize or improve or significantly improve data distribution within a computational architecture by providing multi-level distributed computations, such that the data can be migrated to the most cost effective computation level with minimized or improved cost. However, various computations may have different levels of energy consumption, security enforcement requirements, privacy policies, etc. One of the very important functionalities for optimizing computations is to detect, identify, and determine optimized energy consumption (and energy cost) for each computation. The recognition of factors such as computation capabilities, energy availability, and energy cost at every computation environment, and also energy consumption for each computation can provide guidelines for determining optimized and cost effective strategies for computation distribution and distribution.

SOME EXAMPLE EMBODIMENTS

Therefore, there is a need for an approach for providing energy optimization in multi-level distributed computations.

According to one embodiment, a method comprises determining energy availability information associated with at least one level of a computational architecture executing at least portion of one computation closure. The method also comprises determining energy consumption information associated with the at least portion of one computation closure. The method further comprises processing and/or facilitating a processing of the energy availability information, the energy consumption information, or a combination thereof to determine whether to migrate the at least portion of one computation closure to at least one other level of the computational architecture.

According to another embodiment, an apparatus comprises at least one processor, and at least one memory including computer program code, the at least one memory and the computer program code configured to, with the at least one processor, cause, at least in part, the apparatus to determine energy availability information associated with at least one level of a computational architecture executing at least portion of one computation closure. The apparatus is also caused to determine energy consumption information associated with the at least portion of one computation closure. The apparatus is further caused to process and/or facilitate a processing of the energy availability information, the energy consumption information, or a combination thereof to determine whether to migrate the at least portion of one computation closure to at least one other level of the computational architecture.

According to another embodiment, a computer-readable storage medium carries one or more sequences of one or more instructions which, when executed by one or more processors, cause, at least in part, an apparatus to determine energy availability information associated with at least one level of a computational architecture executing at least portion of one computation closure. The apparatus is also caused to determine energy consumption information associated with the at least portion of one computation closure. The apparatus is further caused to process and/or facilitate a processing of the energy availability information, the energy consumption information, or a combination thereof to determine whether to migrate the at least portion of one computation closure to at least one other level of the computational architecture.

According to another embodiment, an apparatus comprises means for determining energy availability information associated with at least one level of a computational architecture executing at least portion of one computation closure. The apparatus also comprises means for determining energy consumption information associated with the at least portion of one computation closure. The apparatus further comprises means for processing and/or facilitating a processing of the energy availability information, the energy consumption information, or a combination thereof to determine whether to migrate the at least portion of one computation closure to at least one other level of the computational architecture.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing energy optimization in multi-level distributed computations are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "computation closure" identifies a particular computation procedure together with relations and communications among various processes including passing arguments, sharing process results, flow of data and process results, etc. The computation closures (e.g., a granular reflective set of instructions, data, and/or related execution context or state) provide the capability of slicing of computations for processes and transmitting the computation slices between devices, infrastructures and information sources.

As used herein, the term "cloud" refers to an aggregated set of information and computation closures from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats. Although various embodiments are described with respect to clouds, it is contemplated that the approach described herein may be used with other structures and conceptual description methods used to create distributed models of information and computations.

Figure 1:
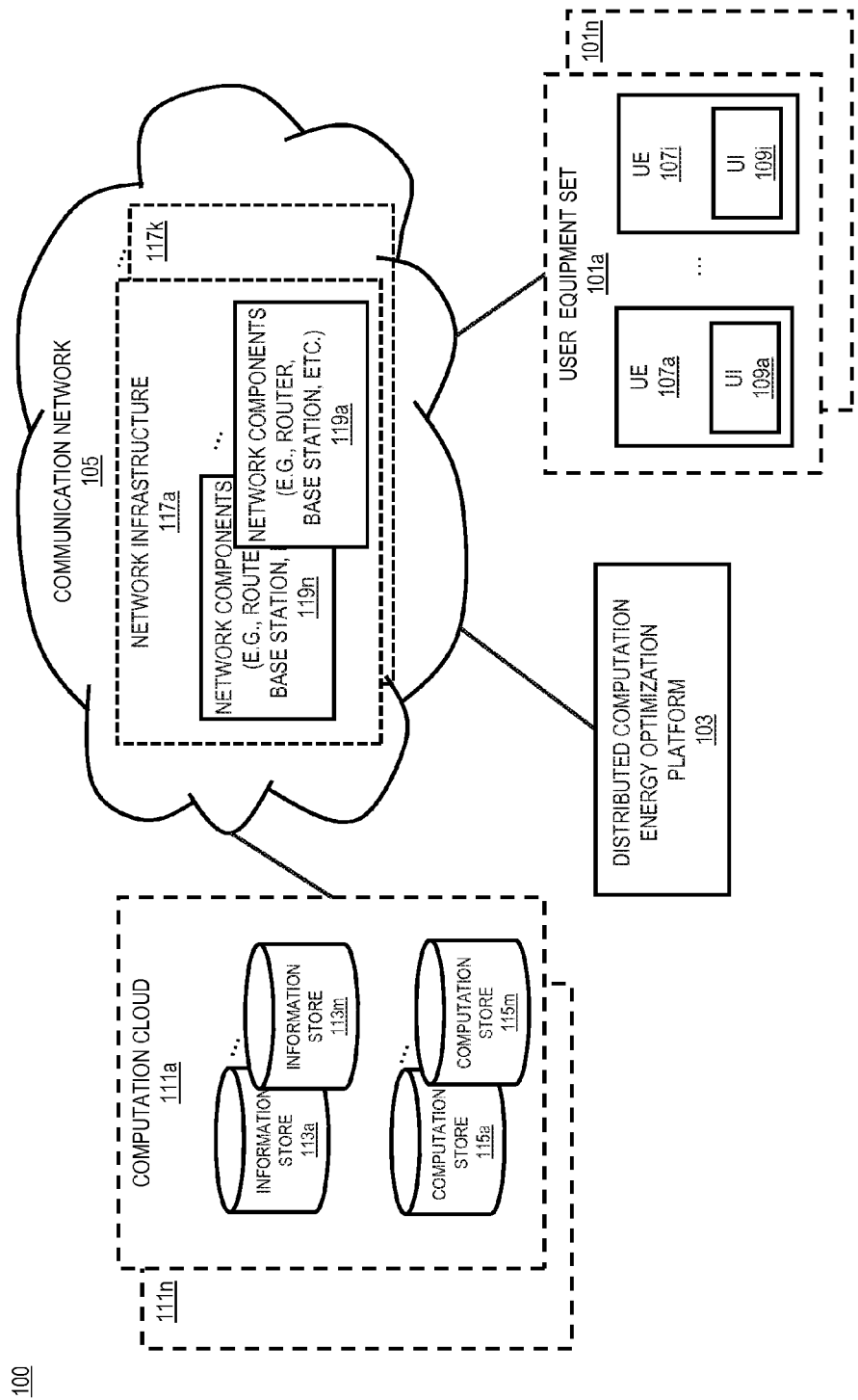
FIG. 1 is a diagram of a system capable of providing energy optimization in multi-level distributed computations, according to one embodiment.

FIG. 1 is a diagram of a system capable of providing energy optimization in multi-level distributed computations, according to one embodiment. As previously described, a cloud environment consists of information and computation resources each consisting of several distributed devices that communicate information and computation closures (e.g. RDF graphs) via a shared memory. A device within a cloud environment may store computation closures locally in its own memory space or publish computation closures on a globally accessible environment within the cloud. In the first case, the device is responsible for any process needed for combination or extraction of computations, while in the second case the processes can be conducted by the globally accessible environment which includes the device. The device can utilize the resources of the architectural infrastructure level, for example for energy saving, without having to access the cloud level, if energy cost is lower at infrastructure level. Alternatively, a device may have direct computational closure connectors to cloud level, where devices are more tightly linked to cloud environment for energy saving purposes.

The basic concept of cloud computing technology provides access to distributed computations for various devices within the scope of the cloud, in such a way that the distributed nature of the computations is hidden from users and it appears to a user as if all the computations are performed on the same device. The cloud computing also enables a user to have control over computation distribution by transferring computations between devices that the user has access to. For example, a user may want to transfer computations among work devices, home devices, and portable devices, other private and public devices, etc. Current technologies enable a user of a mobile device to manipulate contexts such as data and information via the elements of a user interface of their user equipment. However, distribution of computations and processes related to or acting on the data and information within the cloud is typically controlled by the system. In other words, a cloud in general does not provide a user (e.g., an owner of a collection of information distributed over the information space) with the ability to control distribution of related computations and processes of, for instance, applications acting on the information. For example, a contact management application that processes contact information distributed within one or more clouds generally executes on a single device (e.g., with all processes and computations of the application also executing on the same device) to operate on the distributed information. In some cases (e.g., when computations are complex, the data set is large, etc.), providing a means to also distribute the related computations in addition to the information is advantageous.

This goal is achieved by introduction of the capability to construct, distribute, and aggregate computations as well as their related data. More specifically, to enable a user of a cloud (e.g., a mobile device user, an application developer, etc.) who connects to the cloud via one or more devices, to distribute computations among the one or more user devices or other devices with access to the cloud, each computation is deconstructed to its basic or primitive processes or computation closures. Once a computation is divided into its primitive computation closures, the processes within or represented by each closure may be executed in a distributed fashion and the processing results can be collected and aggregated into the result of the execution of the initial overall computation.

In one embodiment, a computational architecture consists of a plurality of architectural levels, including a device level, and infrastructure level, and a cloud computing level. A device from the device level has connectivity to the cloud computing level via one or more infrastructure levels, wherein each infrastructure level may consist of layers and components such as backbones, routers, base stations, etc. Typically, the computation closures associated with a process related to a device from device level are defined, constructed, and executed within the cloud computing level which may have various levels of distribution as well. However, the components of the infrastructure levels may be equipped with various resources (e.g., processing environments, storage spaces, etc.) that can be utilized for the execution of computation closures associated with a process. Since the infrastructure level functions as an interface between the device level and the cloud computing level, if the computation closures can be executed in the infrastructure level, there will be no need for the computation closures to be migrated to the cloud computing level that may very well require excessive use of resources. Therefore, execution of computation closures associated with a process related to a device at the infrastructure level can provide services to device users in a more efficient manner. However, resources such as processing environments, storages, etc. within the multi-level architectural environment of device level, infrastructure level and cloud level each may differ in configuration, availability, processing power, storage volume, communication capability, energy availability level, etc. Furthermore, execution of computation closures may require varying levels of energy depending on, for example, the computation complexity of the closures. Because of this diversity, considering energy related factors such as energy availability of computation environments and energy consumption of computations in distribution of workload across components of an architectural level or among different levels may become a very critical issue and can significantly affect the total computation cost and productivity.

To address this problem, a system 100 of FIG. 1 introduces the capability to provide energy optimization in multi-level distributed computations. A computational architecture environment consists of different levels of proactive computational elements available for various levels of the computational architecture such as device level, infrastructure level, and cloud computing level. Since these computational elements provide various levels of functionality for each of the levels, providing different levels of distribution of the computational closures within the computational architecture enables the execution of the computational closures after the least required level of distribution. However, a very important functionality for optimizing execution of computational closures are to detect, identify, and determine energy availability and cost, including what types and levels of closure capabilities and energy availabilities exist at each part of the multi-level computational levels and components, and what is the efficient distribution of closures, considering their energy consumption cost.

In one embodiment, different components of each architectural level support different types of closures with different energy requirements. Each component (e.g. infrastructure component, node) may have a number of previously created entities, closures and links for the computation of the closures such as connectors between closures, multiple branches, interaction points, rules, etc., that can significantly affect the amount of energy a computation may consume. Furthermore, the computations can be requested to be transferred and/or expanded from one component to another or from an architectural level to another (e.g. from infrastructure to cloud).

In one embodiment, a cloud may include a superset of closure elements (e.g. closure primitives) while the infrastructure or device level components may have subsets of, and therefore the cloud may be capable of supporting computational closures more effectively compared to the infrastructure or device levels. Additionally, a cloud may have access to a wider collection of energy resources from different sources, while the energy resources accessible by an infrastructure may be more limited.

In one embodiment, device setup at various architectural levels such as battery consumption, quality of service (QOS) settings, class of service (COS) settings, priority settings etc., may affect direction and method of computational closure distribution, as different setups may lead to different situations of energy resource availability and requirement. Additionally, energy cost can be indirectly affected by other features of architectural levels such as energy consumption strategies, privacy settings, security enforcements, etc. On the other hand, cost optimization between different architectural levels and components can be achieved by different levels of computation distribution.

In one embodiment, certain amount of computation functionality can be transferred from device level to infrastructure level or further to cloud level depending on the available capabilities at each level. For example, for computations associated with a battery operated laptop computer, it may be more beneficial if parts of the computations are performed at infrastructure level. However, a mobile device plugged to a power socket may receive parts of the computations from the infrastructure if energy cost for the mobile device is lower than the energy cost for the infrastructure. Situations may change when the mobile device is unplugged from the adapter and is back to battery operation mode.

In another embodiment, when an infrastructure node has a limited energy budget, the computations may be transferred to a next nearest node with available energy supply where computation can continue, and redistributed to the cloud level if there is no infrastructure node with sufficient energy available. It is noted that different device setups, limits and thresholds may change the direction of computation closure distribution, as resource availability can be different, for example, depending on the instant battery, energy or power down cost, etc. Furthermore, energy cost can be different and can be indirectly affected by other features of device, infrastructure, or cloud level, such as load balancing, privacy, security enforcements, etc.

In one embodiment, operations can be performed to determine and compare energy consumption of computation closure processes between devices and infrastructures and between infrastructures and clouds. It can also be determined where it is more cost effective to transfer computation closures to, what the energy operational range for each computation closure is (taking into account other capabilities relevant for the computation such as security, privacy levels and rules, other energy issues like battery vs. main power plug connection, etc.), what the minimum and the maximum threshold values for remote/local computations are, etc.

In one embodiment, the cost functions for energy and operational range may determine that to what extent other capabilities can be taken into account. For example, added security cost functions and privacy cost functions can be taken into account when they are within defined operational range. Alternatively, energy cost function may exceed or gets cut beyond upper limit of the operational range cost function.

As shown in FIG. 1, the system 100 comprises a set 101 of user equipments (UEs) 107a-107i having connectivity to distributed computation energy optimization platform 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the UEs 107a-107i are respectively equipped with one or more user interfaces (UI) 109a-109i. Each UI 109a-109i may consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). These contexts may require certain sets of media dependent computational closures, which may affect the service, for example the bit error rate, etc. Additionally, each UI element may be bound to a context/process by granular distribution. In one embodiment, granular distribution enables processes to be implicitly or explicitly migrated between devices, computation clouds, and other infrastructure.

In one embodiment, process distribution can be initiated for example by means of unicast (e.g., to just another device) or multicast (e.g., to multiple other devices). For example one UE 107 may communicate with many infrastructures (or many components of many infrastructures), while many nodes of infrastructures may communicate with multiple clouds. Additionally, process distribution may be triggered via gesture recognition, wherein the user preselects a particular set of UI elements and makes a gesture to simulate "pouring" the selected UE elements from one device to another. In other embodiments, process distribution may be initiated automatically without direct user involvement and based on default setup by the manufacturer of the UE 107a-107i, previous setup by the user of the UE, default setup in an application activated on or associated with a UE 107a-107i, or a combination thereof.

As seen in FIG. 1, a user of UEs 107a-107i may own, use, or otherwise have access to various pieces of information and computations distributed over one or more computation clouds 111a-111n in information stores 113a-113m and computation stores 115a-115m where each of the one or more computation spaces 115a-115m include multiple sets of one or more computation closures. In one embodiment, the user may be an application developer that uses a UE 107a-107i to connect to the infrastructure and the cloud not only for accessing the services provided for end users but also for activities such as developing, distributing, processing, and aggregating various computations.

In one embodiment, the communication network 105 consists of one or more infrastructures 117a-117k wherein each infrastructure is a designed communication system including multiple components 119a-119n. The components 119a-119n include backbones, routers, switches, wireless access points, access methods, protocols, etc. used for communication within the communication network 105 or between communication network 105 and other networks.

In one embodiment, the distributed computation energy optimization platform 103 controls the distribution of computations associated with UEs 107a-107i to other components or levels of the computational architecture including the infrastructure level 117a-117k within the environment of the communication network 105, and the cloud level 111a-111n, based on energy availability associated with different architectural levels and energy consumption requirements of computations.

In one embodiment, computation distribution energy optimization may be initiated by the user, or based on a background activity for example by triggering a sequence of computation closures which in turn support distribution process. Prior to computation distribution the capabilities, including the energy resources available for performing the computations, are evaluated. If capabilities of an architectural level are not satisfactory or changes in capabilities are found, the evaluation process will continue until proper capabilities become available. The capabilities may be found in the same or other levels of the computational architecture and the computation closure execution will be performed at the level where available capabilities are found.

In another embodiment, network components 119a-119n may provide different levels of functionality. For example, some components 119a-119n may provide static computational closures while others may provide dynamic computational closures. As used herein, static computational closures are closures with predetermined configurations, which in return may require a predefined amount of energy for execution, while dynamic computational closures are closures that may function differently based on dynamic factors such as time, traffic load, type or amount of available energy resource, etc. A dynamic computation closure may adjust itself based on the dynamic factors by modifying parameters such as the amount of reserved resources. For example, a dynamic computation closure may downgrade itself in order to consume lower amount of energy at the times of low energy availability.

In one embodiment the amount and type of available energy resources at a component of the infrastructure 117a-117k may or may not be aligned with the required energy by computation closures of UE 107a-107i through a one to one mapping. This means that the component may need to locate (request) further energy resources from current or next layer or level of the computational architecture. In other words, if the energy resources between a process and its processing environment are not directly aligned, the processing environment may expand its resources (for dynamic closures) or request additional resources from other components (for static closures) or a combination thereof. In one embodiment, if neither the direct alignment succeeds nor additional resources found, the setup may be aligned with lower energy requirements. The requirements may be lowered, for example by dropping part of the computational components, reducing media requirements (e.g. reduction of multimedia to voice only or decreasing speed requirements), substituting complex computations with more primitive computations that may produce less accurate, but accurate enough for user's needs, results. Additionally, the satisfaction threshold may be lowered (with service provider and user's agreement) so that a lower level of computation results setup can be considered as satisfactory.

In one embodiment, the computational closures available in multiple levels of device level 101a-101n, infrastructure level 117a-117k, and cloud level 111a-111n are either aligned, meaning that all the computational closures are available in every level, or a super-set of all computational closures is available at cloud level while each lower level has access to a sub-set of the computational closures from its higher level, for example infrastructure level computational closures may be a sub-set of the closures of cloud level and device level closures a sub-set of the infrastructure level closures. Additionally, levels of the computational architecture may have sets of functionally equivalent computational closures in the sense that they perform the same process and produce the same results with different levels of accuracy in return for different levels of energy consumption. For example, a high resolution video providing set of computation closures may have equivalent sets of computation closures that produce the same video output with lower levels of resolution and lower levels of energy consumption. When configuring a UE 107a-107i, the user may select an option for receiving lower levels of resolution in energy restricted occasions, e.g., low battery.

By way of example, the UEs 107a-107i, and the distributed computation energy optimization platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
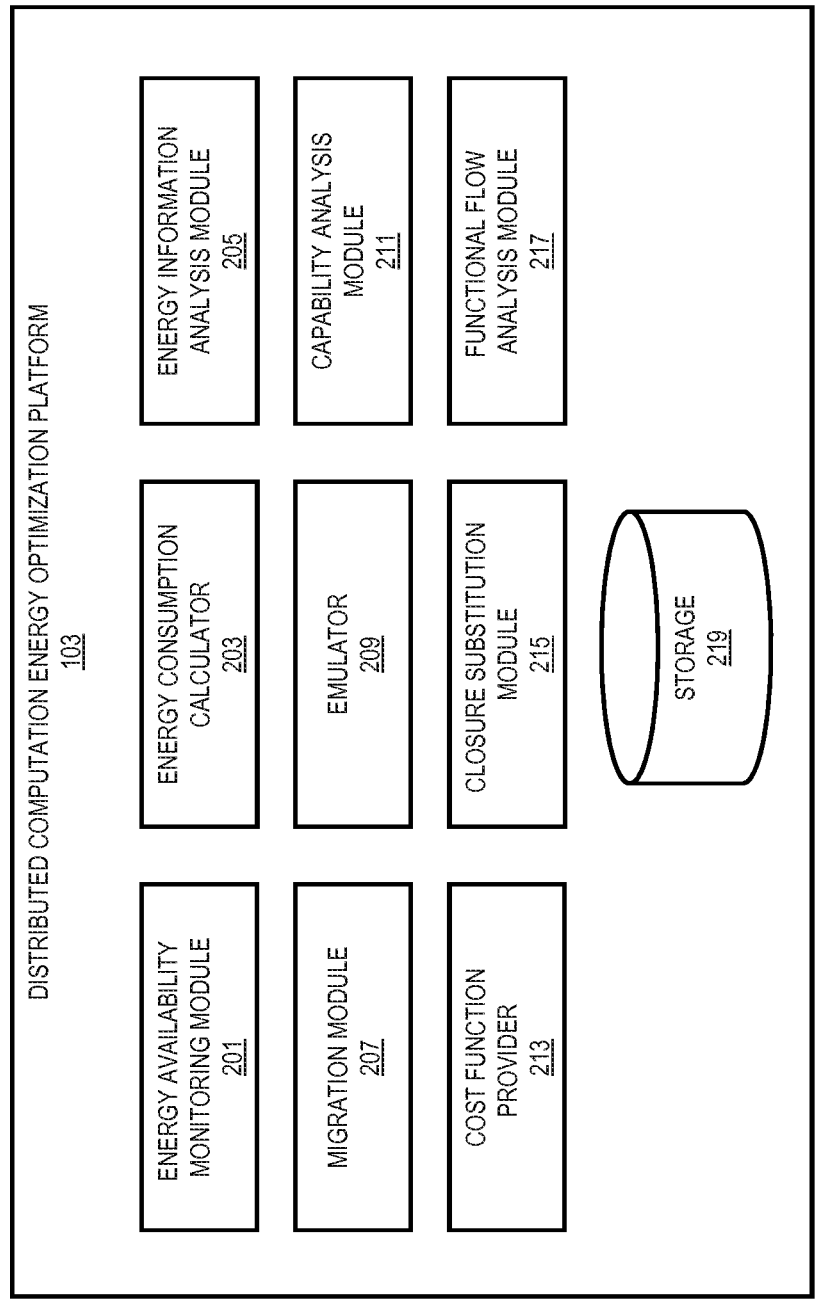
FIG. 2 is a diagram of the components of distributed computation energy optimization platform, according to one embodiment.

FIG. 2 is a diagram of the components of distributed computation energy optimization platform, according to one embodiment. By way of example, the distributed computation energy optimization platform 103 includes one or more components for providing energy optimization in multi-level distributed computations. It is contemplated that the functions of these components may be combined in one or more components or performed by other components of equivalent functionality. In this embodiment, the distributed computation energy optimization platform 103 includes an energy availability monitoring module 201, an energy consumption calculator 203, an energy information analysis module 205, a migration module 207, an emulator 209, a capability analysis module 211, a cost function provider 213, a closure substitution module 215, a functional flow analysis module 217 and a storage 219.

Figure 3:
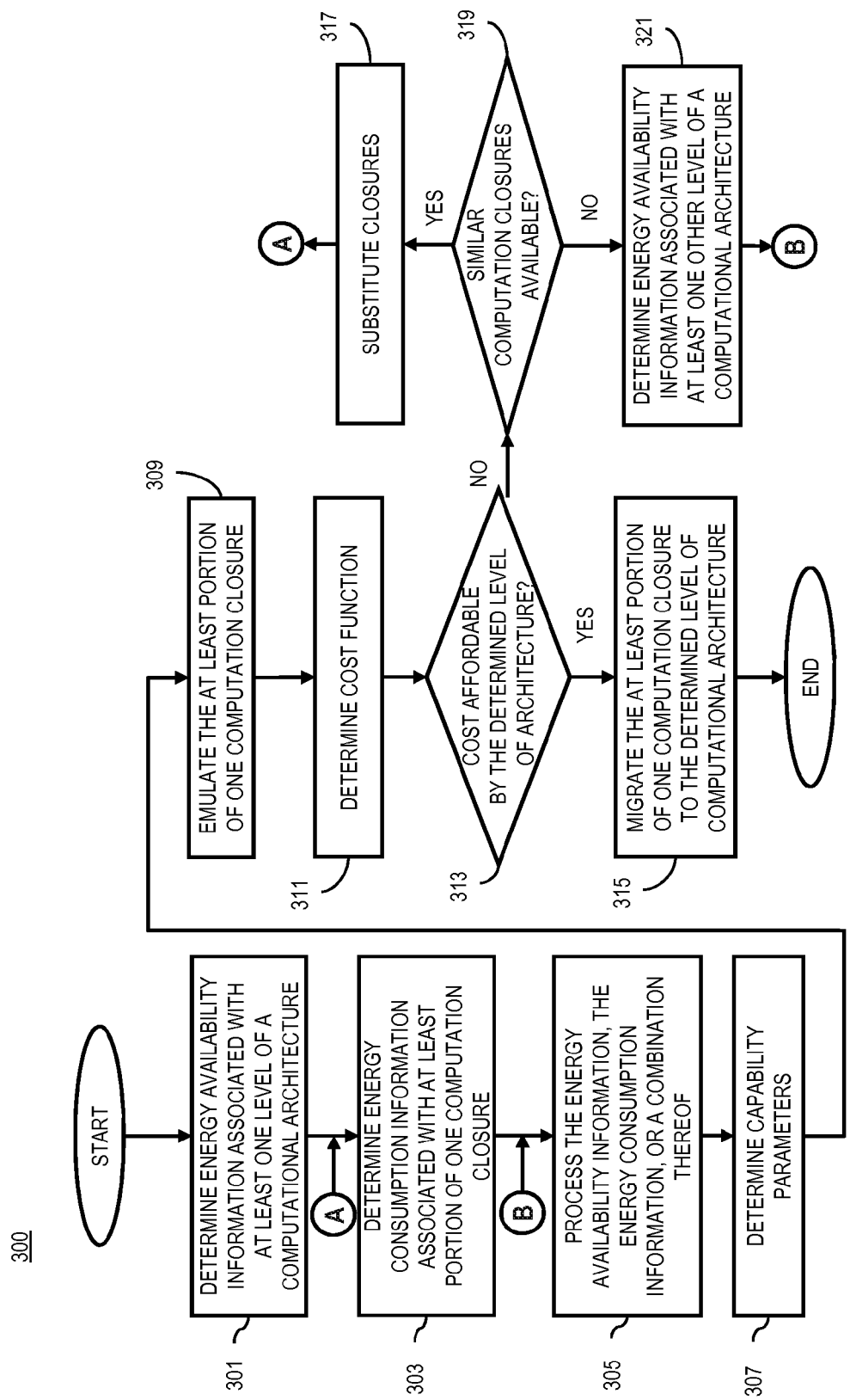
FIG. 3 is a flowchart of a process for providing energy optimization in multi-level distributed computations, according to one embodiment.

FIG. 2 is described with reference to FIG. 3, wherein FIG. 3 shows a flowchart 300 of a process for providing energy optimization in multi-level distributed computations, according to one embodiment. In one embodiment, following the start of the execution of a process (for example, associated with an application related to UE 107) the distributed computation energy optimization platform 103 is assigned with the task of controlling the distribution of computations related to the process according to energy availability and consumption. The computation distribution may be initiated by the user of UE 107, automatically by UE 107 based on pre-determined settings, by other devices or components associated to UE 107, or a combination thereof. Furthermore, the initiation of computation distribution may trigger the activation of distributed computation energy optimization platform 103.

In one embodiment, energy availability monitoring module 201 of the distributed computation energy optimization platform 103 determines energy availability information associated with respective levels of a computational architecture 100, wherein the respective levels include, at least in part, a device level 101a-101n, a infrastructure level 117a-117k, and a cloud computation level 111a-111n (per step 301 of FIG. 3). The determined energy availability can be utilized for deciding at which level each computation should be executed. In one embodiment, the energy availability monitoring module 201 may determine energy availability prior to the start of process distribution. In other embodiments, the energy availability monitoring module 201 may periodically (e.g., based on an initial setup) determine energy availability information associated with different levels of the computational architecture, store the determined data in storage 219, in information stores 113a-113m of clouds 111a-111n, or a combination thereof, and retrieve/reuse the stored data when needed. The energy availability monitoring module 201 may determine and store the energy availability in Resource Description Framework (RDF) format.

In one embodiment, energy consumption calculator 203 of the distributed computation energy optimization platform 103 determines energy consumption information associated with respective computation closures that are going to be executed on a computational architecture 100 (per step 303 of FIG. 3). The determined energy consumption may depend on various factors such as computation complexity and the processing power required for the computation, the amount of other resources that the computation consumes (e.g., memory space), etc. Similar to energy availability, energy consumption information can also be utilized for deciding at which level each computation should be executed. In one embodiment, the energy consumption calculator 203 may determine energy consumption prior to the start of process distribution. In other embodiments, the energy consumption calculator 203 may periodically (e.g., based on an initial setup) determine energy consumption data associated with different sets of computation closures associated with processes, store the determined data in storage 219, in information stores 113a-113m of clouds 111a-111n, or a combination thereof, and retrieve/reuse the stored data when needed. The energy consumption calculator 203 may determine and store the energy consumption in Resource Description Framework (RDF) format.

In one embodiment, as per step 305 of FIG. 3, the energy information analysis module 205 processes, analyzes or facilitates processing or analyzing of the energy availability information from step 301 and the energy consumption information from step 303 in order to determine an optimum distribution plan for distributing the computation closures among the levels of computational architecture by the migration module 207, so that, for example, a balance between local and remote computational levels or any other strategic goals set by users, manufacturers, service providers, etc., can be achieved.

It is noted that determining computation distribution strategies may depend on factors other than energy, such as computational capabilities of various components of architectural levels and of the computation closures. In one embodiment, per step 307 of FIG. 3, the capability analysis module 211 determines one or more capability parameters associated with the computation closures, the level of the computational architecture, at least one other level of the computational architecture, or a combination thereof. The one or more capability parameters include, at least in part, one or more energy parameters, one or more security parameters, one or more privacy parameters, or a combination thereof. The determined capabilities can be utilized by the migration module 207 for deciding at which level of the computational architecture each computation should be executed. In one embodiment, the capability analysis module 211 may determine closure capabilities following the start of process distribution. In other embodiments, the capability analysis module 211 may periodically (e.g., based on an initial setup) determine closure capability data associated with different levels of the computational architecture, store the determined data in storage 219, in information stores 113a-113m of clouds 111a-111n, or a combination thereof, and retrieve/reuse the stored data when needed. The capability analysis module 211 may determine and store the closure capabilities in Resource Description Framework (RDF) format.

In one embodiment, per step 309 of FIG. 3, the emulator 209 determines to cause, at least in part, an emulation of the at least portion of one computation closure for the current, or next available, level of computational architecture. The emulator 209 generates a functional duplicate of the computation closures for the target level of the computational architecture in order to determine the amount of resources, e.g. energy consumption for the computational closures on the specific level of computational architecture. For example, if the migration module 207 determines a level of computational architecture or a component of a level of the computational architecture with sufficient available energy to execute a given set of computation closures, the emulator 209 can provide an emulation of the given set of computation closures that is tailored to the configuration of the determined level (or component) of computational architecture and therefore is executable on the determined level (or component).

In one embodiment, as shown per step 311 of FIG. 3, the cost function provider 213 processes and/or facilitates processing of the one or more parameters such as energy availability, energy consumption and capability information determined in previous steps of FIG. 3 to determine a cost value for the computation closures. The cost functions may be defined by device manufacturers, distributed system management, service providers, or a combination thereof. One or more cost functions may be assigned to each architectural level or to every component of each architectural level. Furthermore, definition of a cost function may take into consideration various factors affecting the cost of computations on a certain component or an architectural level such as energy consumption, energy cost, privacy and/or security enforcement measures, processing power/speed, etc. The determined cost can be utilized by the migration module 207 for deciding at which level of the computational architecture each computation should be executed.

In one embodiment, as per step 313 of FIG. 3, the energy information analysis module 205 determines whether the determined cost by cost function provider 213 in step 311 is affordable for the current level of computational architecture associated, or going to be associated, with the computation closures. The determination of affordability may include determining whether the available energy at the architectural level is sufficient for the energy consumption level of the computation closures. The determination may also include determining, by the energy availability monitoring module 201, whether any changes in energy availability information has occurred. In one embodiment, if changes of energy availability have occurred, the energy information analysis module 205 utilizes the change information for processing the energy availability information, energy consumption information, or a combination thereof. Subsequently, if the available energy resources are sufficient for the consumption, per step 315 of FIG. 3, migration module 207 transfers the computation closures to the computational architecture level with sufficient energy available.

In one embodiment, if the current computational level does not have enough capability for the execution of computation closures, per step 319 the closure substitution module 215 determines at least one other computation closure that is similar or substantially similar to the computation closures and causes, at least in part, presentation of the at least one other computation closure as a substitute for the at least portion of one computation closure. It is noted that similarity among computation closures may for example, include similar input and output with a different, e.g. simpler processes for getting to output from the input.

In one embodiment, presentation of the at least one other computation closure is further based, at least in part, on whether the at least one other computation closure is associated with other energy consumption information that is less than the energy consumption information associated with the at least computation closure. The execution of the at least one other computation closure may produce a result with the same, or lower, output quality with lower energy consumption compared to the initial closure it substituted. The closure substitution module 215 may store the determined similar computation closures in storage 219, in computation stores 115a-115m or anywhere else throughout the various levels of computational architecture. If a similar computation closure is determined, per step 317 the closure substitution module 215 substitutes the determined closures for the initial closures and the process of FIG. 3 continues from step 303 to determine energy consumption for the new closures by the energy consumption calculator 203. In one embodiment, presentation of the at least one other computation closure is further based, at least in part, on whether the at least one other computation closure is associated with other energy consumption information that is less than the energy consumption information associated with the at least computation closure.

In one embodiment, if no similar computation closure is determined by the closure substitution module 215, per step 321 of FIG. 3 the energy availability monitoring module 201 determines energy availability information associated with at least one other level of a computational architecture. This is to determine whether there is at least one other level of computational architecture that is a suitable candidate and has sufficient available energy resources for the execution of computation closures. The process of evaluation of the energy availability at the new level of computational architecture by the energy availability monitoring module 201 will continue from step 305.

In one embodiment, the energy consumption calculator 203 generates energy consumption information based, at least in part, on a functional flow of the computation closures determined by the functional flow analysis module 217. The functional flow analysis module 217 determines functional flow information of the respective levels, including a device level 101a-101n, a infrastructure level 117a-117k, and a cloud computation level 111a-111n, one or more components of the respective levels, or a combination thereof with respect to at least one set of one or more computation closures, wherein the at least one set of one or more computation closures may be a set of computations associated with a process that is going to be executed in a distributed environment. The functional flow can be utilized to identify the computational closures that should be executed at each step of the process. The functional flow analysis module 217 may store the determined information in storage 219, in information stores 113a-113m of clouds 111a-111n, or a combination thereof, and retrieve/reuse the stored data when needed. The determined functional flow information can be utilized by the energy consumption calculator 203 to determine the energy consumption for a set of computation closures involved in the flow.

In one embodiment, at any step of computation distribution if any changes in the capabilities, functional flows, energy availability, energy consumption, or any other parameters of the network are recognized (not shown) (e.g., power shut down, fault in a component, etc.) which may affect the distribution process, the energy availability monitoring module 201, the energy consumption calculator 203 and the capability analysis module 211 may reevaluate the capabilities, availabilities and consumption, and the process of FIG. 3 will restart from step 301. Alternatively if no change occurs, in step 315 the distribution process may be performed by the migration module 207.

It is noted that the determination of energy availability, energy consumption or computation capabilities may be performed either statically, dynamically, or a combination thereof. In the case of static determination, the energy availability, energy consumption or computation capabilities are determined prior to start of computation distribution process and the results are stored for migration module 207 to refer to. Under the static status, the computation closures may be static as well meaning that the closures may consist of pre-coded, preprocessed, pre-computed functions or functions that their availability has been previously insured. As for static closures, all the states of closure and functions are pre-computed so that a particular input will always produce the same output and the internal states remain unchanged.

Alternatively, the energy availability, energy consumption or computation capabilities may be dynamically monitored prior to and during the computation distribution and whenever diagnosing an unsatisfactory condition alert the migration module 207. In any case, the energy availability, energy consumption or computation capabilities determined may not be satisfactory for computation distribution; or the evaluation process may diagnose changes in the capabilities. For example, excessive work load, congestion, technical problems, or power shutdown at an architectural level or at a component of the architectural level may result in unsatisfactory status of the level or the component for computation distribution. In this case, the process of FIG. 3 recalculates the energy availability, energy consumption or computation capabilities, and the needed level of computational closure is re-evaluated by the distributed computation energy optimization platform 103. In this case, the closures may be dynamic, wherein the code is constructed during the execution and furthermore, the internal state of the execution may vary. Also, the output of the computation closure execution may change based on dynamically determined energy availability, energy consumption and computation capabilities.

Figure 4:
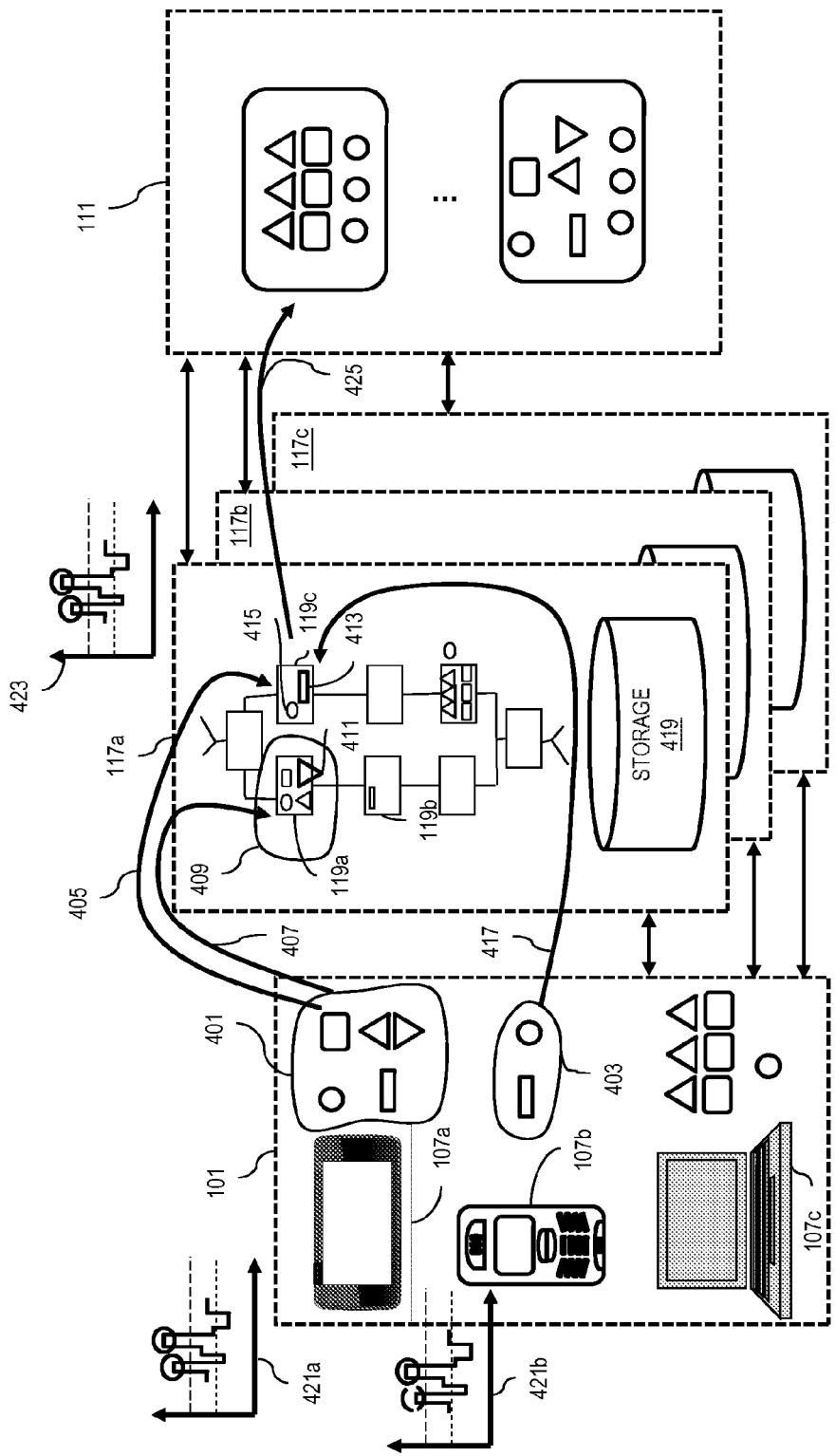
FIG. 4 is a diagram of multi-level computational architecture with energy optimization, according to one embodiment.

FIG. 4 is a diagram of multi-level computational architecture with energy optimization, according to one embodiment. In one embodiment, the set 101 comprises UEs 107a, 107b, and 107c, wherein UE 107a needs set 401 and UE 107b needs set 403 of computation closures to be executed. The diagrams 421a and 421b show the amount of energy requirement for computation closures 401 and 403 respectively to be executed on associated devices 107a or 107b. In each diagram 421a and 421b the horizontal axis shows time and the vertical axis shows energy cost. Furthermore, the two dotted horizontal lines in each diagram show the minimum and maximum thresholds for energy cost on that specific level of computational architecture.

In one embodiment, whenever the cost of energy requirement for a set 401 or 403 of computation closures exceeds the maximum cost line (exceeded parts marked by circles in FIG. 4) on the current level of computational architecture, the computation is distributed to the next level such as infrastructure level. The distributed computation energy optimization platform 103 receives a request from UE 107a for distribution of set 401. The migration module 207 of the distributed computation energy optimization platform 103 uses the information provided by the energy availability monitoring module 201, energy consumption calculator 203, and other components of the distributed computation energy optimization platform 103, as described with respect to the flowchart of FIG. 3, in order to select a component of the infrastructure levels 117a, 117b, or 117c for the distribution of computation closures 401 and 403. In the example of FIG. 4, the closure substitution module 215 has selected components 119a and 119c from infrastructure 117a as substitutes for 401 and 403 respectively. In this example, component 119a includes three of the five closures from set 401, but has capability for execution of four of the five closures from set 401. Therefore, the migration module 207 migrates the fourth closure 411 to the component 119a (shown by arrow 407) and the fifth closure 413 to component 119c (shown by arrow 405). Once the execution is completed, the results of execution of set 409 can be aggregated with the result from execution of closure 413. In the case of UE 107b and set 403 of computation closures, the distributed computation energy optimization platform 103 may select component 119c for migrating process 403. In this example, set 403 can be replaced by computation closures 413 and 415 (shown by arrow 417). This means that closures 413 and 415 can be executed to produce results for closure set 403. The execution results may be stored in storage 419 for further process.

In one embodiment, distributed computation energy optimization platform 103 may be informed about energy availabilities found in infrastructure components or clouds via the energy availability monitoring module 201. The distributed computation energy optimization platform 103 may periodically receive updated information about available energy and updated parameters from the infrastructures or clouds and the energy availability monitoring module 201. Similarly, in various embodiments, if the infrastructure levels 117 does not have sufficient available energy resource, the computations can be migrated to the cloud 111. For example diagram 423 shows that the energy requirement for computations 413 and 415 of component 119c in infrastructure 117a exceed the maximum threshold, as shown by arrow 425, the computation is migrated to cloud 111.

As previously discussed, the capabilities and energy availability of either point of the distribution (e.g. UE 107a or component 119a) may change. For example, a component 119a may lose its power supply, the UE 107a may be plugged to main power supply instead of being operated by a battery, etc. In such cases, the distributed computation energy optimization platform 103 determines the change and adjusts the parameters accordingly.

Figure 5A:
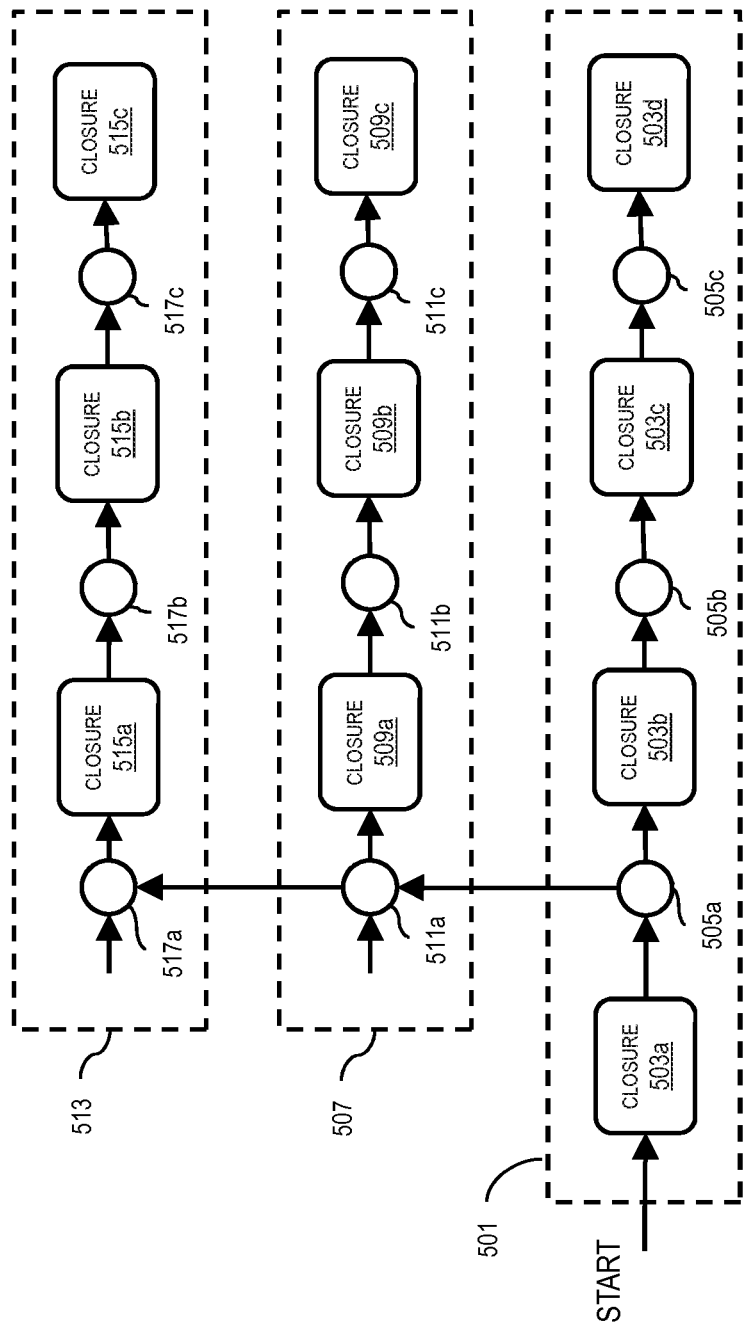
FIGS. 5A-5B are diagrams of computation distribution and energy optimization in multi-level computational architecture, according to one embodiment.
Figure 5B:
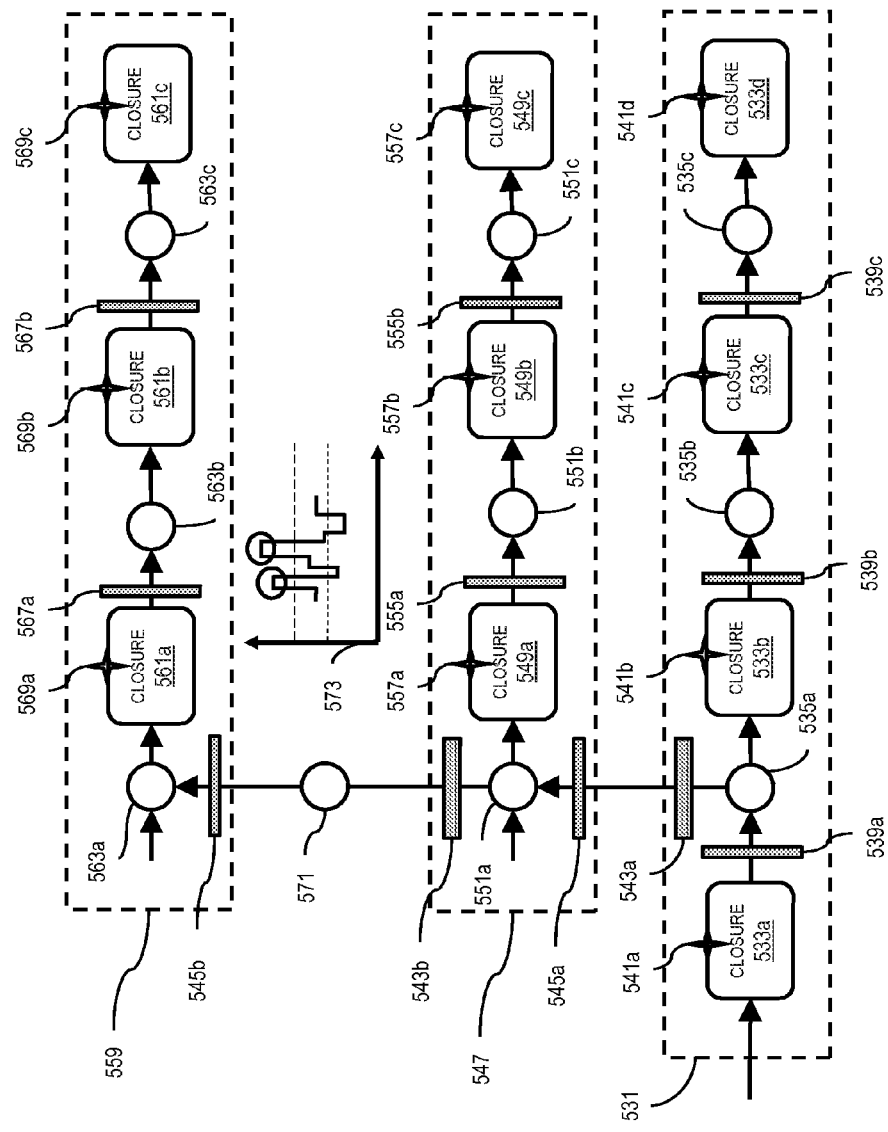

FIGS. 5A-5B are diagrams of computation distribution and energy optimization in multi-level computational architecture, according to one embodiment. FIG. 5A is a general representation of computation distribution. As seen in FIG. 5A, the computation distribution starts at a component 501 of an architectural level (not shown). Each component may execute a set of closures that constitute a computation branch. For example, the branch 501 is composed of closures 503a-503d, wherein every two consecutive closures are connected via a connector and computational branches are communicating via connectors as well. For example, connectors 505a-505c connect closures 503a-503d. Connectors may also transfer information and data associated with a closure and its execution results to the next closure in the branch or to other branches. Additionally, connectors may function as links between related branches that constitute a distributed computation.

In one embodiment, connectors may contain information about parameters such as energy availability, energy consumption, capabilities, functional flows, distribution maps, links between closures and architectural levels, etc. Arrows connecting closures to connectors and connectors to next closures show the functional flow adopted based on the parameters. As seen in FIG. 5A, the closures have been distributed from component 501 to component 507 via communication between connector 505a and connector 511a. The computation branch of component 507 includes closures 509a-509c communicating via connectors 511b and 511c, while branches 501 and 507 communicate via connectors 505a and 511a. Similarly, a third branch 513 has been formed of closures 515a-515c being executed at component 513 and connected by connectors 517b and 517c, while the branch communicates with other branches via connector 517a.

In one embodiment, the initial branch 501 may be in a UE 107a-107i, the second branch 507 in a component of the infrastructure 117a-117n, and the third branch in another component of the same infrastructure, a different infrastructure, in a cloud, or a combination thereof.

FIG. 5B shows a computation distribution together with various parameters affecting the distribution. As seen in FIG. 5B, the computation distribution starts at a component 531 of an architectural level (not shown). Each component may execute a set of closures that constitute a computation branch. For example, the branch 531 is composed of closures 533a-533d, wherein every two consecutive closures are connected via a connector and computational branches are communicating via connectors as well. For example, connectors 535a-535c connect closures 533a-533d. Connectors may also transfer information and data associated with a closure and its execution results to the next closure in the branch or to other branches. Additionally, connectors may function as links between related branches that constitute a distributed computation.

In one embodiment, connectors may contain information about parameters such as capabilities including energy availability and energy consumption, cost function, functional flow specifications, distribution maps, links between closures and architectural levels, etc. Arrows connecting closures to connectors and connectors to next closures show the functional flow adopted based on the parameters. For example, star signs 541a-541d, 557a-557c, and 569a-569c represent the capability parameters provided by the energy availability monitoring module 201, energy consumption calculator 203 and the capability analysis module 211 and associated with each closure 533a-533d, 549a-549c, and 561a-561c respectively. Additionally, blocks 539a-539c, 555a-555b, 567a-567b, and 543a-543b represent cost values provided for one or more closures by the cost function provider 213. In the example of FIG. 5B, the cost value 539a shows the cost for binding closure 533b to closure 533a and directs closure 533b to branch 531, via connector 535a, as the next closure to be executed after closure 533a. In one embodiment, if the value of certain parameters, such as energy cost, based on the analyses by the energy availability monitoring module 201, energy consumption calculator 203, capability analysis module 211 and the functional flow analysis module 217 exceed a certain thresholds, some computational closure may be omitted from the chain in the current branch, for the value to be reduced. The closures may be initially assigned with priority levels, so that less important closures can be omitted if necessary. Similarly, cost values 539b and 539c direct closures 533c and 533d in branch 531 via connectors 537b and 537c. In a higher level of hierarchy, the cost value 545a directs closures 549a-549c to component 547 and similarly the cost value 545b directs closures 561a-561c to component 559. As shown at connector 571, the energy diagram 573 shows the energy diagram for computation closures 549a-549c. Since the energy consumption for the closures has exceeded the horizontal line of the maximum threshold, at component 547, the closures are being migrated to component 559 via connector 571. Additionally, if the energy requirement does not exceed the maximum threshold, in branch 547, connectors 551a-551c and cost values 555a and 555b direct closures 549a-549c down the path of branch 547. Similarly, in branch 559, connectors 563a-563c and cost values 567a and 567b direct closures 561a-561c down the path of branch 559.

Figure 6:
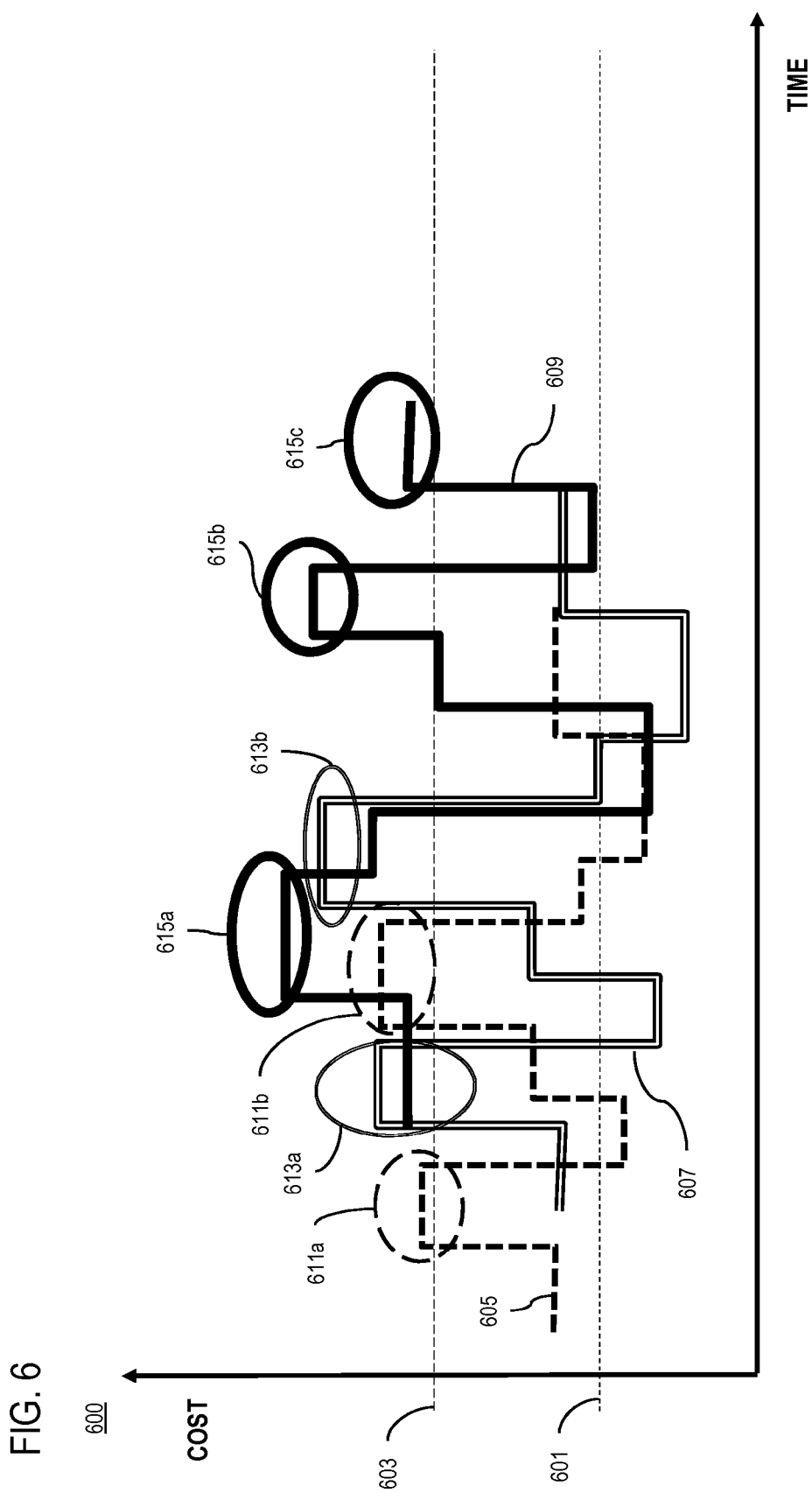
FIG. 6 is a diagram of energy cost estimation when other capabilities are involved, according to one embodiment.

FIG. 6 is a diagram of energy cost estimation when other capabilities are involved, according to one embodiment. The diagram 600 of FIG. 6 shows computation cost values with respect to time. In one embodiment, other than energy cost two other cost sources namely security cost and privacy cost can be considered. In the example of FIG. 6 three curves 605, 607, and 609 represent energy cost, privacy cost and security cost respectively. The two horizontal lines 601 and 603 show the minimum and maximum cost threshold, meaning that where the cost curves exceed the maximum threshold is the time when distribution of computations may be considered in order to lower the costs. For example, the energy cost 605 exceeds the maximum threshold 603 at points identified by circles 611a and 611b. Similarly, the privacy cost 607 exceeds the maximum threshold at points 613a and 613b, while security cost 609 exceeds the threshold at points 615a, 615b, and 615c.

In one embodiment, a balance between the costs of various capabilities can be created. For example, if application of a certain privacy rule required excessive energy use, parts of the privacy may be omitted in order to avoid excess energy consumption. In this embodiment, the computations may be migrated to other levels of the computational architecture, for example from device to infrastructure or from infrastructure to the cloud, when the combined cost of energy, privacy, and security exceeds the maximum threshold. Additionally, the computation cost can be considered as a function (F) of three variables E (energy cost), P (privacy cost) and S (security cost) as $F(E, P, S) = x*E + y*P + z*S$, where x, y, and z are factors identifying the importance (weight) of each cost item for the computation. For example, in order to keep the total cost F at a predetermined level when limited energy is available, reduction of y or z factors can reduce the privacy and security cost and allow for the total cost to remain unchanged. In one embodiment, the values of factors x, y, and z can be interpreted by the distributed computation energy optimization platform 103 based on predetermined setups by the user, manufacturer, service provider, or a combination thereof.

Figure 7:
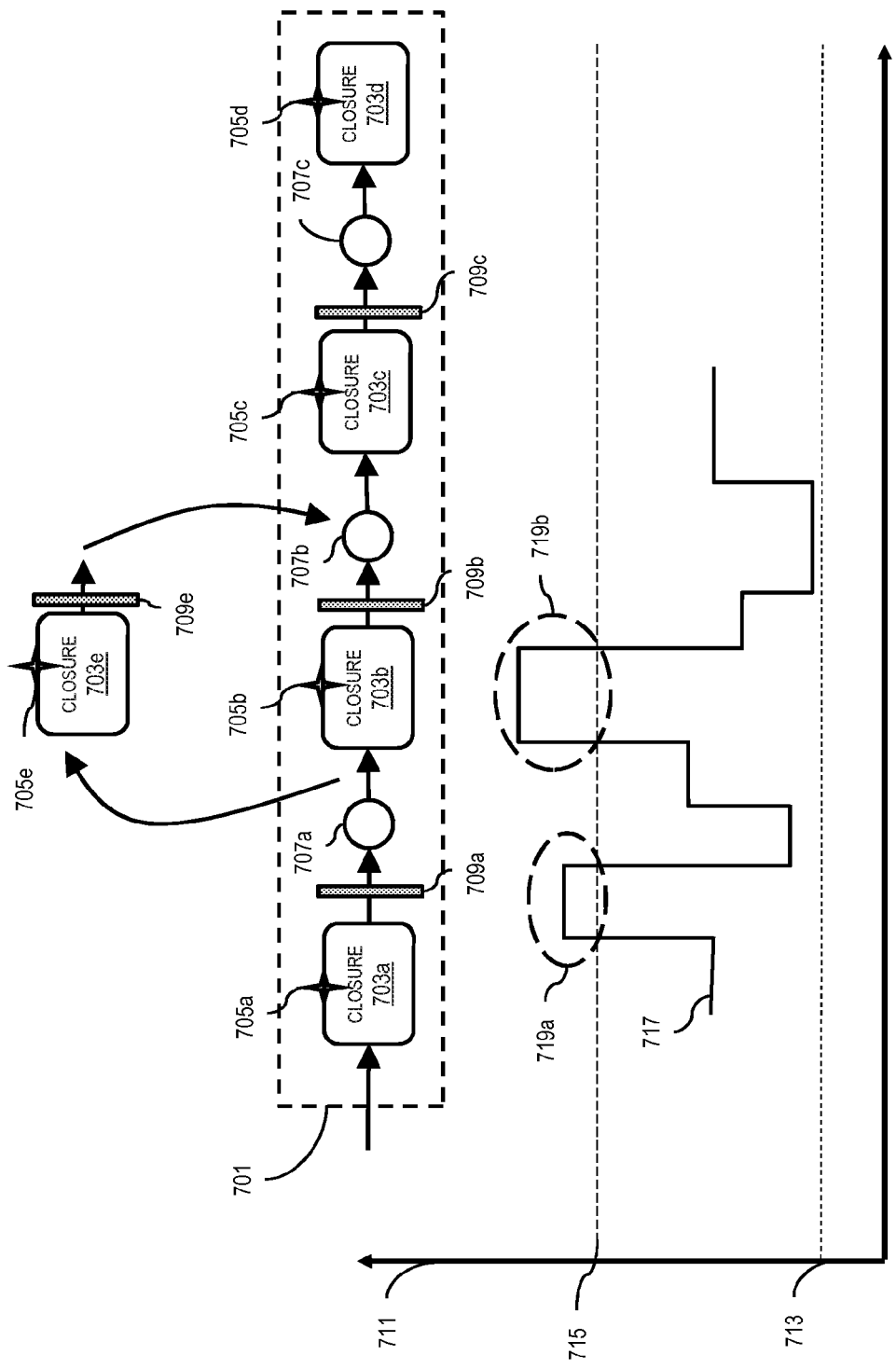
FIG. 7 is a diagram of energy cost evaluation and computation chain construction, according to one embodiment.

FIG. 7 is a diagram of energy cost evaluation and computation chain construction, according to one embodiment. In one embodiment, the computation distribution starts at a component 701 of an architectural level (not shown). The component 701 may execute a set of closures 703a-703d that constitute a computation branch wherein every two consecutive closures are connected via a connector 707a-707c. Connectors may also transfer information and data associated with a closure and its execution results to the next closure in the. Additionally, star signs 705a-705d represent the capability parameters provided by the energy availability monitoring module 201, energy consumption calculator 203 and the capability analysis module 211 and associated with each closure respectively. Furthermore, blocks 709a-709c represent cost values provided for one or more closures by the cost function provider 213. For example, the cost value 709a shows the cost for binding closure 703b to closure 703a and may cause the closure 703b to be substituted by closure 703e from another branch in the computational architecture (not shown) as the next closure to be executed after closure 703a, via connectors 707a and 707b.

In the example of FIG. 7, graph 711 with the horizontal axis representing time and the vertical axis representing energy cost, the curve 717 represents energy cost for the computation chain 701 provided by the energy consumption calculator 203. The two horizontal lines 713 and 715 show the minimum and maximum cost thresholds, meaning that where the cost curves exceed the maximum threshold is the time when distribution of computations may be considered in order to lower the costs. For example, the energy cost 717 exceeds the maximum threshold line 715 at points identified by circles 719a and 719b. As seen in FIG. 7, the closure 703b is the bottleneck which consumes a higher than maximum level of energy.

In one embodiment, the energy availability monitoring module 201 identifies other levels of computational architecture (not shown) for distribution of the closure set 701 to. The energy information analysis module processes the energy consumption information, energy availability information and other capabilities of various levels of the computational architecture provided by the capability analysis module 211 and decided whether to migrate the computation closure set 701 to another level of the computational architecture. The capability analysis module 211 may also receive information from the closure substitution module 215, identifying closures that can be substituted with other closures with lower energy consumption. In the exemplary embodiment of FIG. 7, the closure substitution module 215 has identified closure 703e as a substitute for closure 703b in order to lower the energy consumption shown in circle 719b. Following the substitution of closure 703b with closure 703e, the functional flow analysis module 217 modifies the functional flow so that the flow can bypass closure 703b and continue on to closure 703e instead. The connectors 707a and 707b are updated accordingly to represent correct to and from links for closures. Following the modification of the closure chain, the migration module 207 may use the information provided by the energy availability monitoring module 201, energy consumption calculator 203, capability analysis module 211 and other component of the distributed computation energy optimization platform 103 to distribute the closures of chain 701 to be executed in optimal levels of computational architecture (not shown).

Figure 8A:
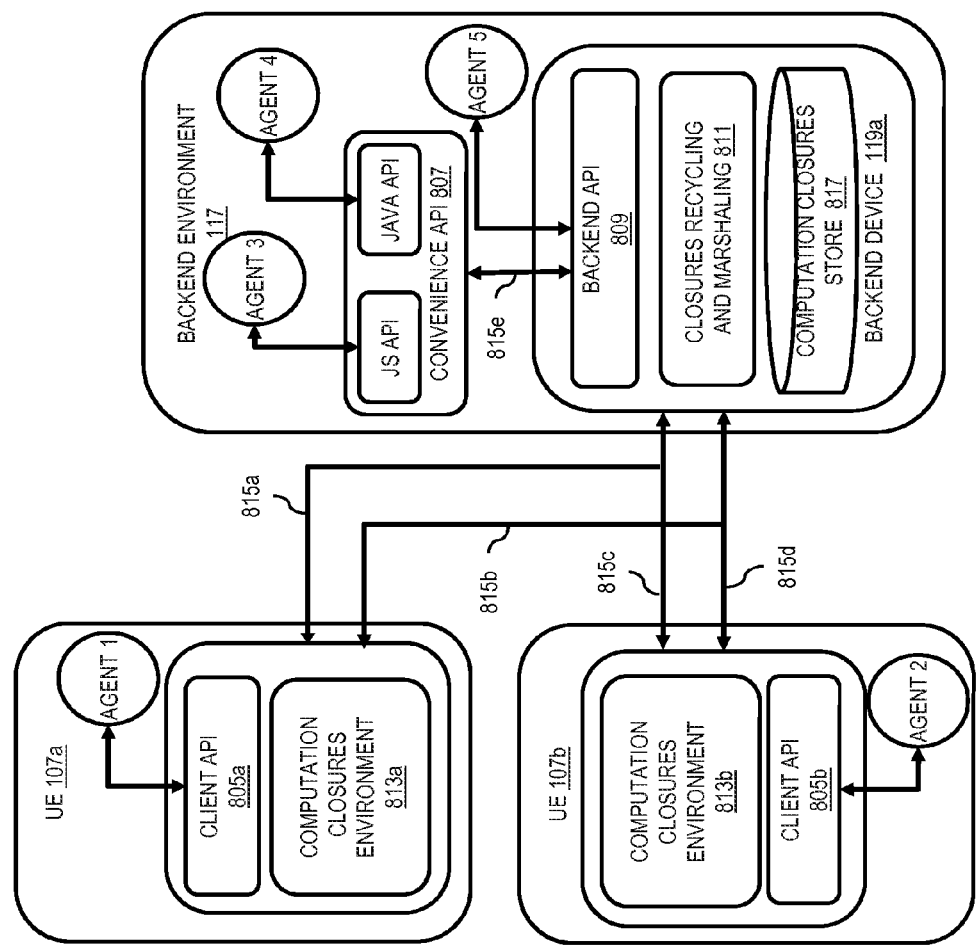
FIGS. 8A-8B are diagrams of computation distribution among devices, according to one embodiment.
Figure 8B:
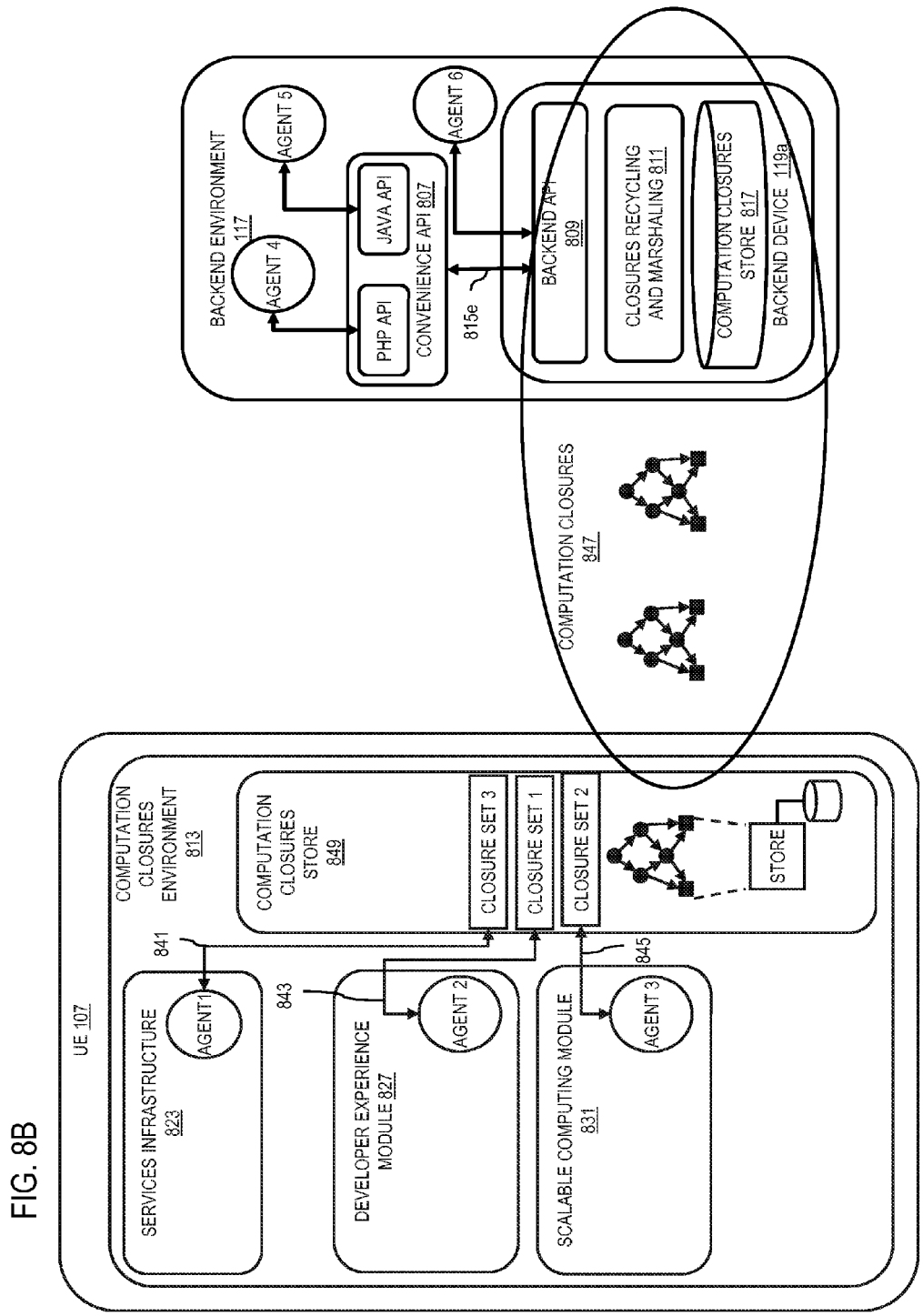

FIGS. 8A-8B are diagrams of computation distribution among devices, according to one embodiment. In one embodiment, in FIG. 8A, the backend environment 117 is a network infrastructure. The backend environment may also be a virtual run-time environment within a cloud 111 associated with the owner of UE 107a or on another UE 107b associated with the user. The backend environment 117 may include one or more components (backend devices) 119a and one or more Application Programming Interface (API) such as a convenience API 807 that may include APIs tailored to the software development environments used (e.g. JAVA, PHP, etc.). Furthermore, UEs 107a and 107b may include client APIs 805a and 805b. Each API enables interaction between devices and components within another device or an environment. For example, backend API 809 enables interaction between the backend device 119a and Agent5, and convenience API 807 enables interaction between the backend device 119a and agents Agent3 and Agent4, wherein each agent is a set of processes that handle computation closures within the backend environment 117. APIs 805a and 805b enable interaction between UE 107a and agent Agent1, and UE 107b and agent Agent2 respectively. As seen in the example of FIG. 8A, Agent3 works under PHP while Agent4 is a JAVA process. Each of the UEs 107a and 107b has a computation closure environment 813a and 813b which may be part of a cloud 111. Arrows 815a-815e represent distribution path of computation closures among the environments 813a, 813b and the computation closures store 817. The computation closures store 817 is a repository of computation closures that can be accessed and used by all the UEs and infrastructure components having connectivity to the backend environment 117.

In one embodiment, the backend device 119a may be equipped with a closure recycling and marshaling component 811 that monitors and manages any access to the computation closures store 817. In other embodiments the closure recycling and marshaling (i.e. standardization for uniform use) may be a function of the distributed computation energy optimization platform 103.

In one embodiment, the computation closures within environments 813a, 813b and the computation closures store 817 may be composed based on anonymous function objects and automatically created by a compiling system using methods for generating anonymous function objects such as lambda expressions.

FIG. 8B is an expanded view of a computation closure environment 813 as introduced in FIG. 8A. The computation closure environment 813 may be composed of one or more computation closure generating components. In one embodiment the computation closure environment 813 has a services infrastructure 823 that provides various services for the user of the UE 107. The services may include any application that can be performed on the UE 107 such as, games, music, text messaging, voice calls, etc. In one embodiment, the services infrastructure 823 provides support for closure distribution under the supervision of a distributed computation energy optimization platform 103 as discussed in FIG. 1, FIG. 2, and FIG. 3. The agent Agent1 retrieves the computation closures required by the services infrastructure 823 from the computation closures store 849 and stores the newly generated computation closures by the services infrastructure 823 into the computation closures store 849 for distribution purposes per arrow 841.

In another embodiment, the computation closure environment 813 has a developer experience module 827 that provides various tools for a developer for manipulating services offered by the UE 107. The tools may include standardized and/or abstract data types and services allowing the developers to chain processes together across development platforms. In one embodiment, the developer experience module 827 provides cross platform support for abstract data types and services under the supervision of a distributed computation energy optimization platform 103 as discussed in FIG. 1. The agent Agent2 retrieves the computation closures required by the developer experience module 827 from the computation closures store 849 and stores the newly generated computation closures by the developer experience module 827 into the computation closures store 849 for distribution purposes per arrow 843.

In yet another embodiment, the computation closure environment 813 has a scalable computing module 831 that provides an abstract wrapper (i.e. monadic wrapper) for the migrating closures 401. This abstraction provides computation compatibility between the closures 401 and the UE 107. The abstract wrapper may provide scheduling, memory management, system calls and other services for various processes associated with the closures 401. These services are provided under the supervision of the distributed computation energy optimization platform 103 as discussed in FIG. 1. The agent Agent3 retrieves the computation closures required by the scalable computing module 831 from the computation closures store 849 and stores the newly generated computation closures by the scalable computing module 831 into the computation closures store 849 for distribution purposes per arrow 845. In one embodiment, the backend environment 117 may access the computation closures store 849 and exchange/migrate one or more computer closures 847 between the computation closures store 849 and the backend computation closures store 817.

Figure 9:
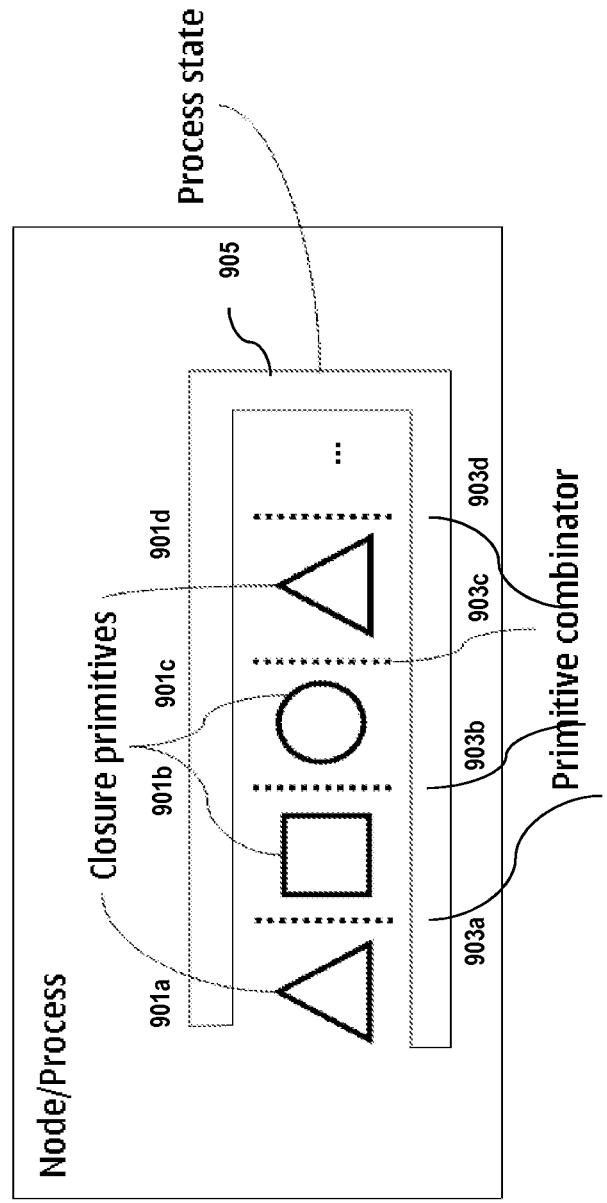
FIG. 9 is a diagram showing a process as a combination of primitive computation closures, according to one embodiment.

FIG. 9 is a diagram showing a process as a combination of primitive computation closures, according to one embodiment. Process 900 consists of closure primitives 901a-901d. The closure primitives 901a-901d, which are similar to closures 411, 413 and 415 in FIG. 4, are combined with each other into process 900 by combinators 903a-903d. The object 905 represents the execution requirements including process states under which the execution of closures 901a-901d combined by combinators 903a-903d will result in the process 900.

In one embodiment, distribution of process 900 by the migration module 207 of the distributed computation energy optimization platform 103 includes distribution of closures 901a-901d, combinators 903a-903d and the process states 905 as independent elements into, for instance, an infrastructure environment 117. The independent closures 901a-901d from infrastructure environment 117 may be distributed into different components 119a-119m where they may be executed.

Figure 10:
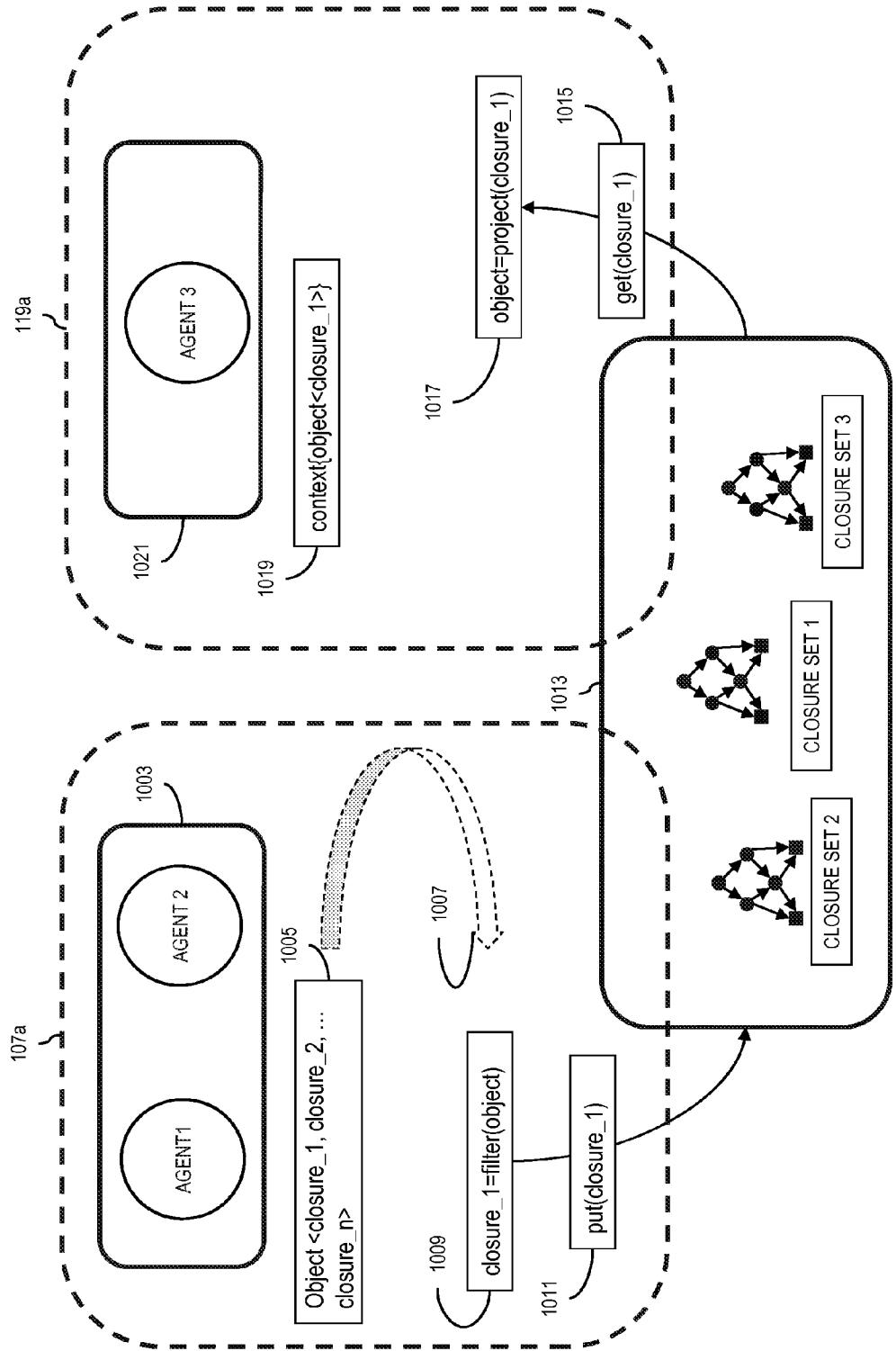
FIG. 10 is a diagram of process distribution from a device to another device, according to one embodiment.

FIG. 10 is a diagram of process distribution from a device to another device, according to one embodiment. In one embodiment, the device 107a is a UE associated with the user. The UE 107a may include a user context 1003 which is being migrated among devices. Agent1 and agent2 are processors that calculate and handle computation closures within the user context 1003. The number of agents may be different in different devices based on their design, functionality, processing power, etc. Block 1005 represents an Object as a set of computation closures, closure_1, closure_2, . . . , and closure_n, where each closure is a component of a larger process, for example, related to a service provided to the user by the user equipment 107a. Each closure is a standalone process that can be executed independently from the other closures. In the example of FIG. 10, the filtering process 1007 extracts closure_1 from the closure set Object via filtering the set (shown in block 1009). The extracted closure_1 is added to a computation closure store 1013 using the exemplary Put command 1011.

It is assumed, in this example, that component 119a of an infrastructure level (not shown) is selected by the distributed computation energy optimization platform 103 as a destination for closure distribution from UE 107a. The extracted computation closure, closure_1 is migrated to component 119a by the migration module 207 of the distributed computation energy optimization platform 103, and executed on component 119a.

In one embodiment, the component 119a receives the computation closure closure_1 and extracts it from the computation closure store 1013 using the Get command 1015. The extracted closure_1 is projected into a closure with the user device context and the object 1017 is produced. The block 1019 represents the reconstruction of the closure into the initial context by a component in charge of the execution. The aggregated context may then be executed in the run-time environment 1021 of component 119a by Agent3.

In another embodiment, the UE 107a and component 119a may exchange places and the distribution is performed from the component 119a to UE 107a or both devices may be UEs. In this embodiment the decomposition and aggregation processes are similar to the above example.

Figure 11:
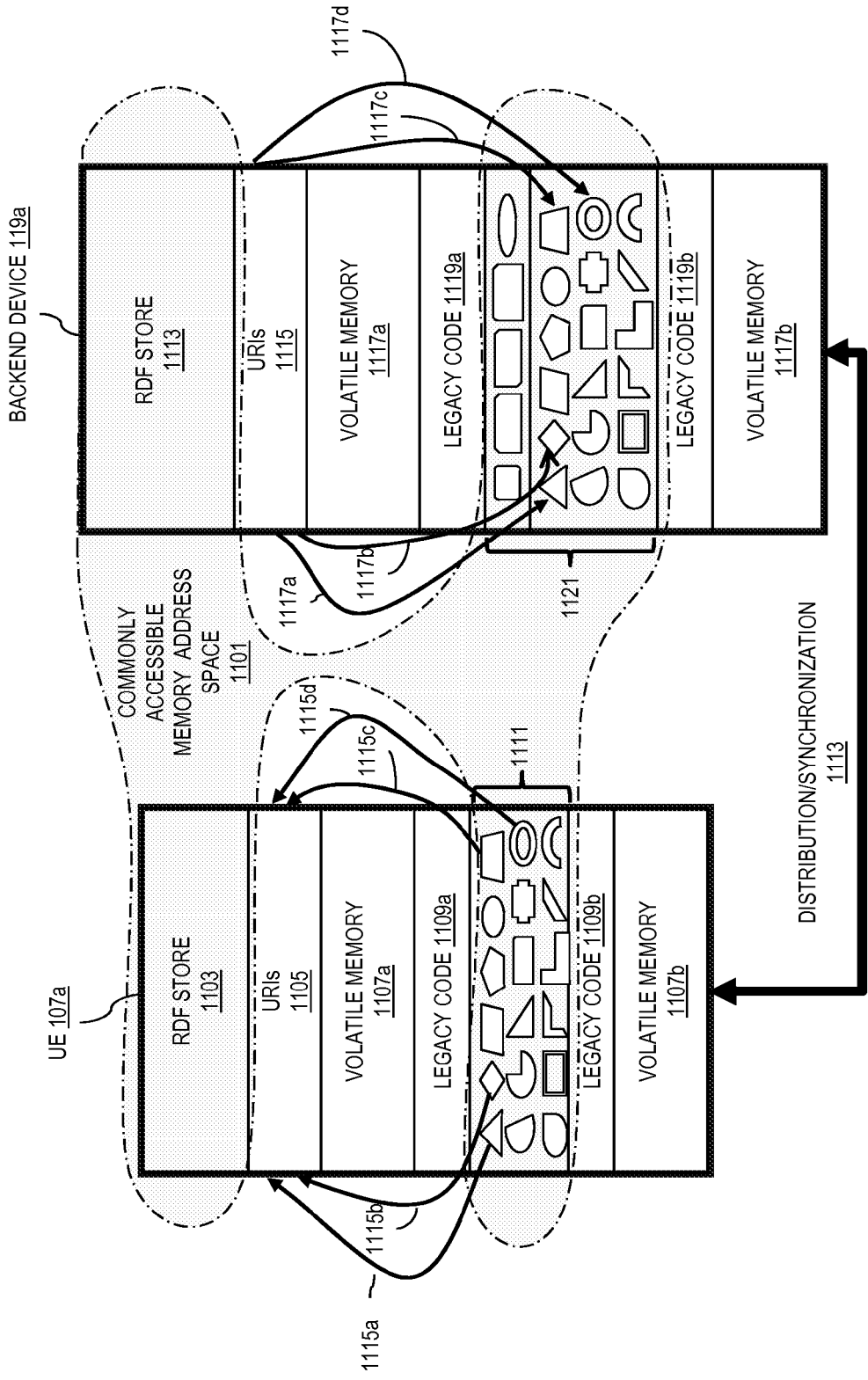
FIG. 11 is a diagram of computation closure allocation/mapping, according to one embodiment.

FIG. 11 is a diagram of computation closure allocation/mapping, according to one embodiment. The diagram of FIG. 11 shows a commonly accessible memory address space 1101 formed between a UE 107a as a client and the backend device 119a as a component of a computation infrastructure 117.

In one embodiment, the UE 107a may include RDF store 1103, which holds computation closures for processes associated with the UE 107a. Similarly the backend device 119a may includes a RDF store 1113, which holds computation closures associated with processes related to device 119a, UEs 107a-107i, or any other devices having connectivity to device 119a or cloud 111.

In other embodiments, the Uniform Resource Identifiers (URIs) 1105 in UE 107a and 1115 in backend device 119a may be used to identify names or resources accessible to their respective devices via the communication network 105. Furthermore, the legacy codes associated with each device may be stored in legacy code memory areas 1109a and 1109b on UE 107a and 1119a and 1119b on backend device 119a.

In one embodiment, UE 107a may be provided with a non-volatile memory space 1111 as a closure store. The closure store 1111 may include a set of closure primitives shown as geometric objects, similar to primitives of sets 401 or 403 of FIG. 4. Similarly, the backend device 119a may be provided with a non-volatile memory space 1121 as a closure store. The closure store 1121 may also include a set of closure primitives shown as geometric objects. In one embodiment, the closure store 1111 is a subset of closure store 1121 determined, at least in part, based on one or more criteria such as time of access, frequency of access, a priority classification, etc. Since non-volatile memories are costly and require extensive resources (e.g. power consumption) compared with volatile memories (such as 1107a, 1107b, 1117a, and 1117b), the capacity of non-volatile memory on a UE 107a-107i is limited. However, a backend device 119a, serving high numbers of users, may be equipped with larger volumes of non-volatile memory spaces. Because of the limited capacity of non-volatile memory spaces on UEs 107a-107i, a subset of the closure store 1121 is stored locally at the closure store 1111 for local use by the UE 107a. In order to minimize the number of times a UE 107 needs to retrieve one or more primitives from closure store 1121 of device 119a, the subset 1111 is determined based on one or more criteria. In one embodiment, the closure store 1111 may be determined as a set of the most frequently accessed closure primitives of closure store 1121 by UE 107a. In another embodiment, the closure store 1111 may be determined as a set of the most recently accessed closure primitives of closure store 1121 by UE 107*a*. In other embodiments, various combined conditions and criteria may be used for determining subset 1111 from set 1121 as the content of closure store for UE 107*a*. Furthermore, the closure stores 1111 and 1121 may be periodically synchronized. The synchronization of closure stores ensures that any changes (addition, deletion, modification, etc.) in closure primitives of closure store 1121 are reflected in the closure store 1111.

In one embodiment, for execution of a closure set 401 (a subset of closure store 1111) associated with a process on UE 107*a*, the set 401 can be migrated by the migration module 207 of the distributed computation control platform 103 to the backend device 119*a* which is a component of the infrastructure 117 (the distribution path shown as arrow 1123). The distributed computation control platform 103 may then inform the processing components of the UE 107*a*, the backend device 119*a* or a combination thereof (the processing components are not shown), that the closure primitives are ready for execution.

In one embodiment, any changes on the closure store 1121 of the backend device 119*a* (e.g., addition, deletion, modification, etc.) may first enter the URIs 1115 via the communication network 105. The changes may then be applied from URIs 1115 on closure store 1121 shown by arrows 1127*a*-1127*d*. Similarly, the closure store 1111 is updated based on the content of the closure store 1121 and the updates are shared with other components within UE 107*a* (e.g. with URIs 1105 as shown by arrows 1125*a*-1125*d*).

In one embodiment, the commonly accessible memory address space 1101 is formed from the RDF stores 1103 and 1113 and the closure stores 1111 and 1121. The commonly accessible memory address space 1101 can be accessed as a continuous memory space by each of the devices 107*a* and 119*a*.

The processes described herein for providing energy optimization in multi-level distributed computations may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 12:
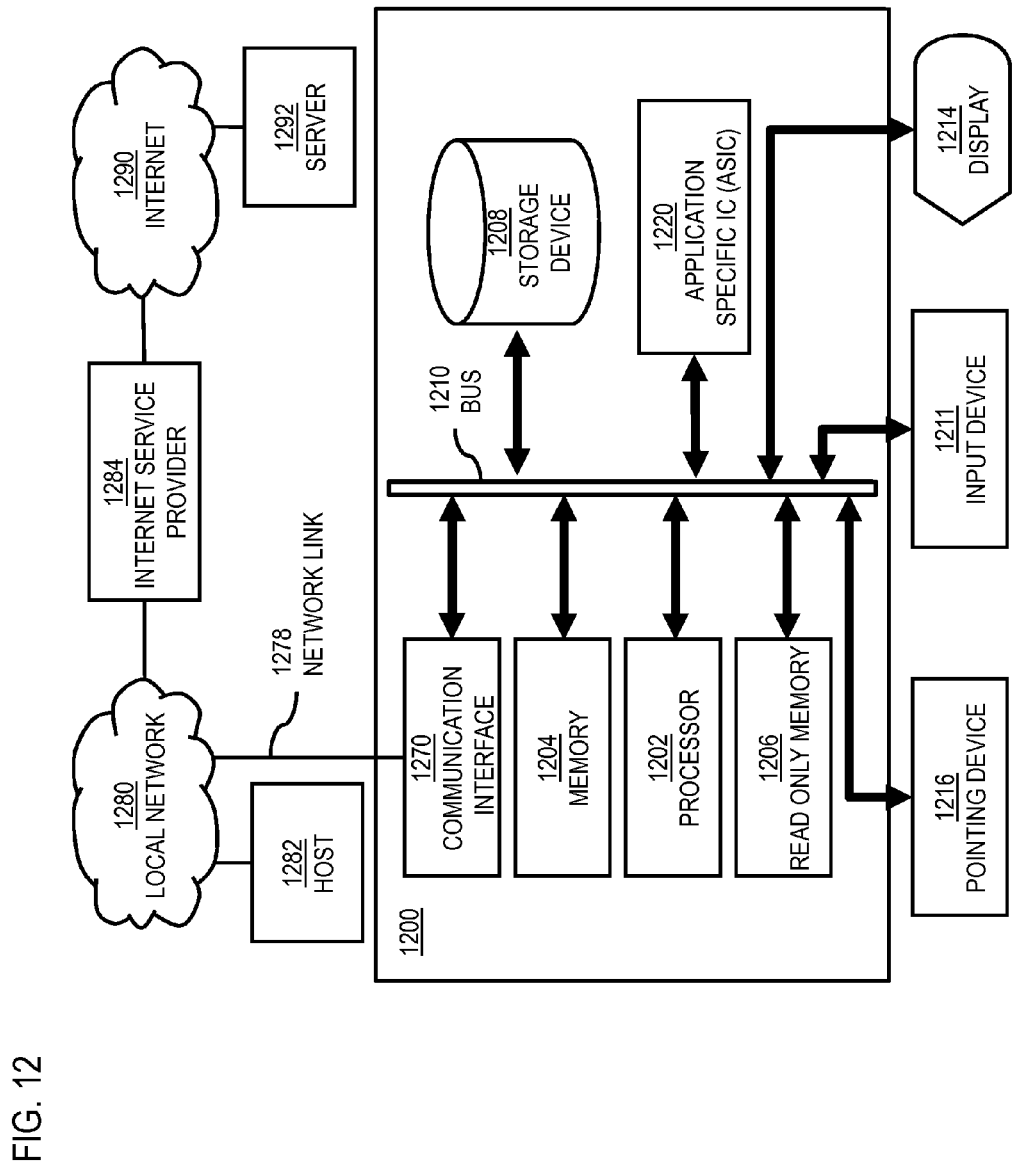
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to provide energy optimization in multi-level distributed computations as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of providing energy optimization in multi-level distributed computations.

A bus 1210 includes one or more parallel conductors of information so that information is transferred quickly among devices coupled to the bus 1210. One or more processors 1202 for processing information are coupled with the bus 1210.

A processor (or multiple processors) 1202 performs a set of operations on information as specified by computer program code related to providing energy optimization in multi-level distributed computations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or any other dynamic storage device, stores information including processor instructions for providing energy optimization in multi-level distributed computations. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or any other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for providing energy optimization in multi-level distributed computations, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT), a liquid crystal display (LCD), a light emitting diode (LED) display, an organic LED (OLED) display, a plasma screen, or a printer for presenting text or images, and a pointing device 1216, such as a mouse, a trackball, cursor direction keys, or a motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of ASICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 105 for providing energy optimization in multi-level distributed computations to the UEs 107a-107i.

The term "computer-readable medium" as used herein refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or any other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

Figure 13:
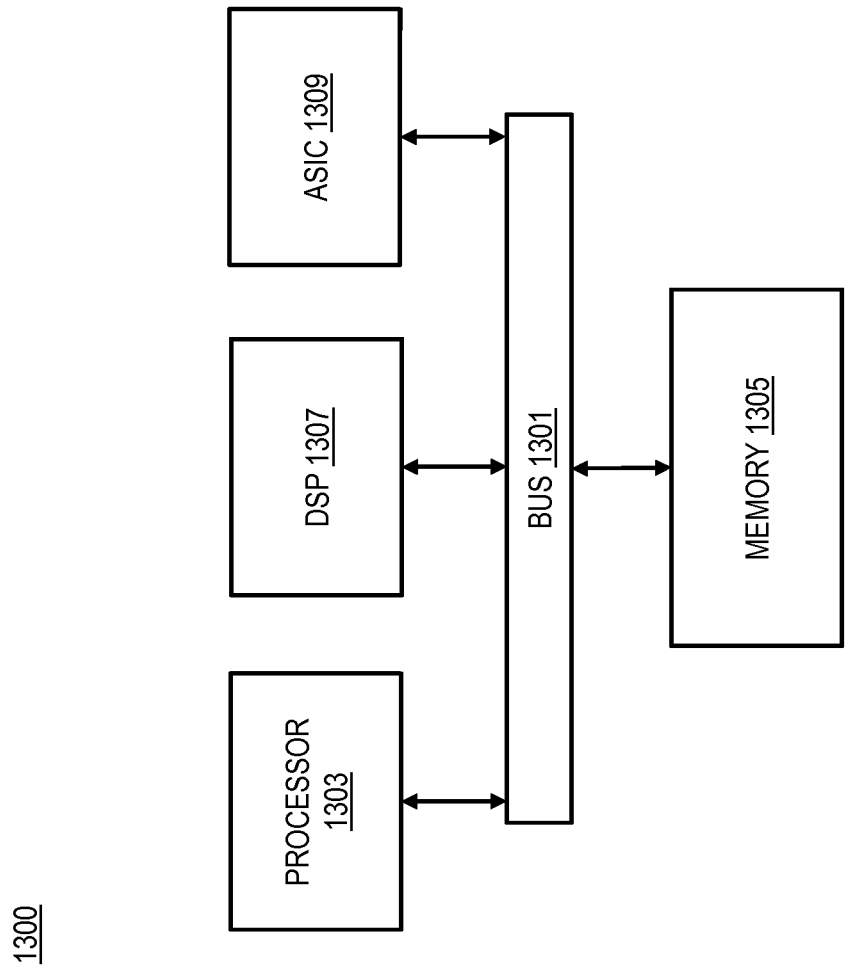
FIG. 13 is a diagram of a chip set that can be used to implement an embodiment of the invention.

FIG. 13 illustrates a chip set or chip 1300 upon which an embodiment of the invention may be implemented. Chip set 1300 is programmed to provide energy optimization in multi-level distributed computations as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1300 can be implemented in a single chip. It is further contemplated that in certain embodiments the chip set or chip 1300 can be implemented as a single "system on a chip." It is further contemplated that in certain embodiments a separate ASIC would not be used, for example, and that all relevant functions as disclosed herein would be performed by a processor or processors. Chip set or chip 1300, or a portion thereof, constitutes a means for performing one or more steps of providing user interface navigation information associated with the availability of functions. Chip set or chip 1300, or a portion thereof, constitutes a means for performing one or more steps of providing energy optimization in multi-level distributed computations.

In one embodiment, the chip set or chip 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1300 includes merely one or more processors and some software and/or firmware supporting and/or relating to and/or for the one or more processors.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to provide energy optimization in multi-level distributed computations. The memory 1305 also stores the data associated with or generated by the execution of the inventive steps.

Figure 14:
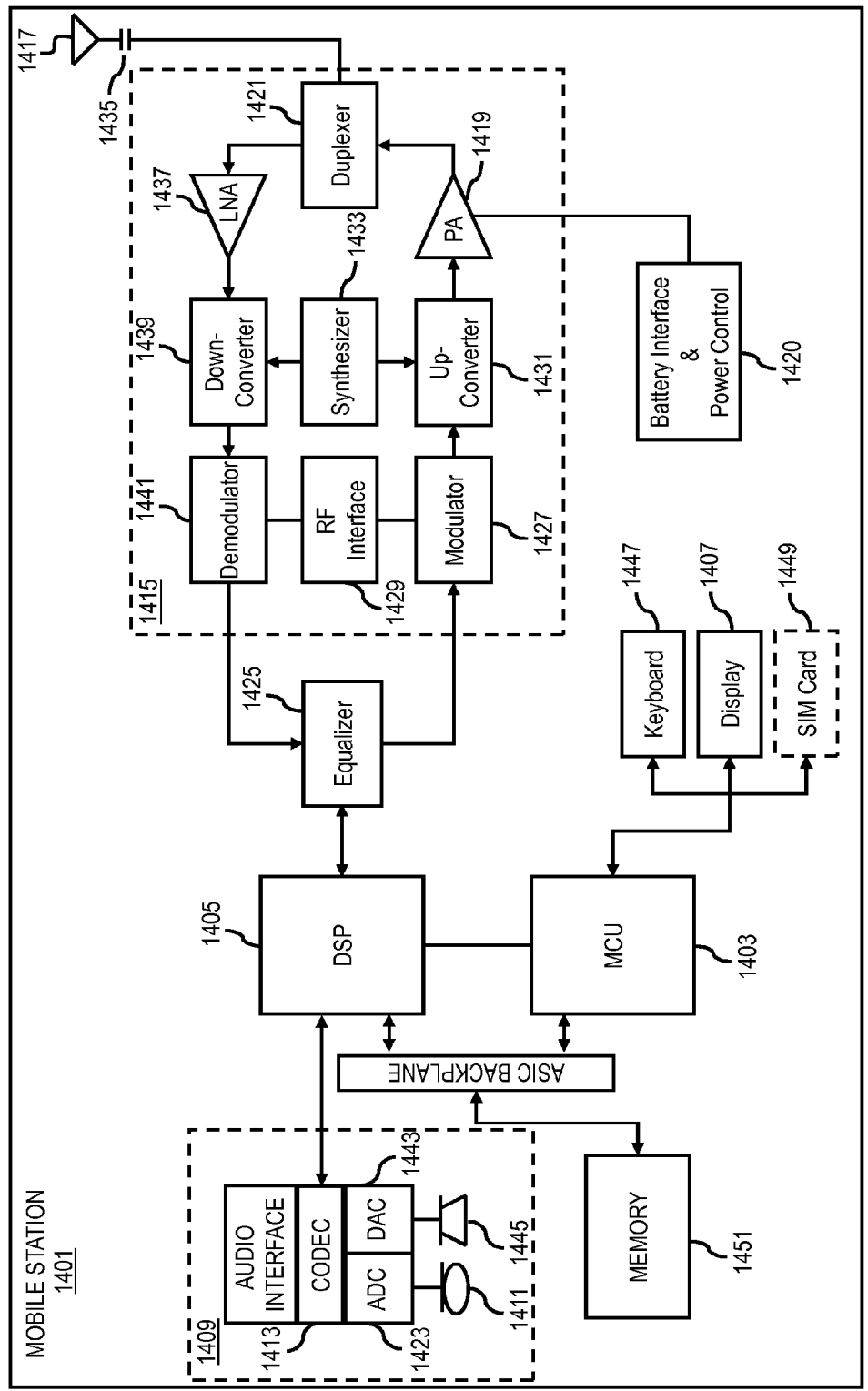
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1401, or a portion thereof, constitutes a means for performing one or more steps of providing energy optimization in multi-level distributed computations. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of providing energy optimization in multi-level distributed computations. The display 1407 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403 which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to provide energy optimization in multi-level distributed computations. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining energy availability information associated with at least one level of a computational architecture executing at least one portion of one computation closure;
   determining energy consumption information associated with the at least one portion of one computation closure; and
   processing and/or facilitating a processing of the energy availability information, the energy consumption information, or a combination thereof to determine whether to migrate the at least one portion of one computation closure to at least one other level of the computational architecture.

2. A method of claim 1, further comprising:
   determining other energy availability information associated with the at least one other level of the computational architecture,
   wherein the determination of whether to migrate the at least one portion of one computation closure is further based, at least in part, on the other energy availability information.

3. A method of claim 1, further comprising:
   determining to cause, at least in part, an emulation of the at least one portion of one computation closure,
   wherein the energy consumption information is based, at least in part, on the emulation.

4. A method of claim 1, further comprising:
   determining at least one change in the energy availability information; and
   determining to cause, at least in part, the processing of the energy availability information, the energy consumption information, or a combination thereof based, at least in part, on the at least one change.

5. A method of claim 1, further comprising:
   determining one or more capability parameters associated with the at least one portion of one computation closure, the at least one level of the computational architecture, the at least one other level of the computational architecture, or a combination thereof,
   wherein the determination of whether to migrate the at least one portion of one computation closure is further based, at least in part, on the one or more capability parameters, and the at least one level of the computational architecture is a device level and the at least one other level of the computational architecture is at least one of an infrastructure level and a cloud computing level.

6. A method of claim 5, further comprising:
   processing and/or facilitating a processing of the one or more capability parameters to determine a cost function,
   wherein the determination of whether to migrate the at least one portion of one computation closure is further based, at least in part, on the cost function.

7. A method of claim 5, wherein the one or more capability parameters include, at least in part, one or more energy parameters, one or more security parameters, one or more privacy parameters, or a combination thereof.

8. A method of claim 1, further comprising:
   determining at least one other computation closure that is similar or substantially similar to the at least one portion of one computation closure; and
   causing, at least in part, presentation of the at least one other computation closure as a substitute for the at least one portion of one computation closure.

9. A method of claim 8, wherein the presentation of the at least one other computation closure is further based, at least in part, on whether the at least one other computation closure is associated with other energy consumption information that is less than the energy consumption information associated with the at least one computation closure.

10. A method of claim 1, wherein the energy consumption information is based, at least in part, on a functional flow of the at least one portion of one computation closure.

11. An apparatus comprising:
    at least one processor; and
    at least one memory including computer program code for one or more programs,
    the at least one memory and the computer program code configured to, with the at least one processor, cause the apparatus to perform at least the following,
    determine energy availability information associated with at least one level of a computational architecture executing at least one portion of one computation closure;
    determine energy consumption information associated with the at least one portion of one computation closure; and
    process and/or facilitate a processing of the energy availability information, the energy consumption information, or a combination thereof to determine whether to migrate the at least one portion of one computation closure to at least one other level of the computational architecture.

12. An apparatus of claim 11, wherein the apparatus is further caused to:
    determine other energy availability information associated with the at least one other level of the computational architecture,
    wherein the determination of whether to migrate the at least one portion of one computation closure is further based, at least in part, on the other energy availability information.

13. An apparatus of claim 11, wherein the apparatus is further caused to:
    determine to cause, at least in part, an emulation of the at least one portion of one computation closure,
    wherein the energy consumption information is based, at least in part, on the emulation.

14. An apparatus of claim 11, wherein the apparatus is further caused to:
    determine at least one change in the energy availability information; and
    determine to cause, at least in part, the processing of the energy availability information, the energy consumption information, or a combination thereof based, at least in part, on the at least one change.

15. An apparatus of claim 11, wherein the apparatus is further caused to:
    determine one or more capability parameters associated with the at least one portion of one computation closure, the at least one level of the computational architecture, the at least one other level of the computational architecture, or a combination thereof,
wherein the determination of whether to migrate the at least one portion of one computation closure is further based, at least in part, on the one or more capability parameters, and the at least one level of the computational architecture is a device level and the at least one other level of the computational architecture is at least one of an infrastructure level and a cloud computing level.

16. An apparatus of claim 15, wherein the apparatus is further caused to:
    process and/or facilitate a processing of the one or more capability parameters to determine a cost function,
    wherein the determination of whether to migrate the at least one portion of one computation closure is further based, at least in part, on the cost function.

17. An apparatus of claim 15, wherein the one or more capability parameters include, at least in part, one or more energy parameters, one or more security parameters, one or more privacy parameters, or a combination thereof.

18. An apparatus of claim 11, wherein the apparatus is further caused to:
    determine at least one other computation closure that is similar or substantially similar to the at least one portion of one computation closure; and
    cause, at least in part, presentation of the at least one other computation closure as a substitute for the at least one portion of one computation closure.

19. An apparatus of claim 18, wherein the presentation of the at least one other computation closure is further based, at least in part, on whether the at least one other computation closure is associated with other energy consumption information that is less than the energy consumption information associated with the at least one computation closure.

20. An apparatus of claim 11, wherein the energy consumption information is based, at least in part, on a functional flow of the at least one portion of one computation closure.

* * * * *